(12) United States Patent
Sahin et al.

(10) Patent No.: US 12,244,420 B2
(45) Date of Patent: Mar. 4, 2025

(54) SHORT PHYSICAL UPLINK CONTROL CHANNEL (sPUCCH) STRUCTURE

(71) Applicant: INTERDIGITAL PATENT HOLDINGS, INC., Wilmington, DE (US)

(72) Inventors: Alphan Sahin, Westbury, NY (US);
Rui Yang, Greenlawn, NY (US);
Erdem Bala, East Meadow, NY (US);
Shahrokh Nayeb Nazar, San Diego, CA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/377,684

(22) Filed: Oct. 6, 2023

(65) Prior Publication Data

US 2024/0063950 A1 Feb. 22, 2024

Related U.S. Application Data

(63) Continuation of application No. 16/960,937, filed as application No. PCT/US2019/012893 on Jan. 9, 2019.
(Continued)

(51) Int. Cl.
*H04L 1/1607* (2023.01)
*H04L 5/00* (2006.01)
(Continued)

(52) U.S. Cl.
CPC .......... *H04L 1/1607* (2013.01); *H04L 5/0055* (2013.01); *H04L 27/2607* (2013.01);
(Continued)

(58) Field of Classification Search
CPC ..... H04L 5/0098; H04L 5/001; H04L 5/0053; H04L 5/0078; H04W 72/0453;
(Continued)

(56) References Cited

U.S. PATENT DOCUMENTS 8,494,006 B2 7/2013 Lee et al.
10,021,674 B2 7/2018 Han et al.
(Continued)

FOREIGN PATENT DOCUMENTS

CN 102754357 A 10/2012
CN 107046718 8/2017
(Continued)

OTHER PUBLICATIONS

Qualcomm, "Channelization of 1-symbol short PUCCH with more than 2 bits payload, "3GPP TSG RAN WG1 NR Ad-Hoc#2, R171189, Qingdao, China (Jun. 27-30, 2017).
(Continued)

*Primary Examiner* — Mansour Oveissi
(74) *Attorney, Agent, or Firm* — Volpe Koenig

(57) ABSTRACT

A wireless transmit/receive unit (WTRU) may receive a downlink transmission and send a physical uplink control channel (PUCCH) transmission in each resource block (RB) of an interlace of a plurality of RBs in an active bandwidth part (BWP). A base sequence is mapped to the PUCCH transmission repetitively, once to each RB of the plurality of RBs of the interlace, using a different cyclic shift of the base sequence for each RB. Each different cyclic shift of the base sequence in the PUCCH transmission to each RB is a function of a RB index of the respective RB. The PUCCH transmission indicates either an acknowledgement (ACK) or a negative ACK (NACK) of the received downlink transmission.

14 Claims, 23 Drawing Sheets

Related U.S. Application Data

(60) Provisional application No. 62/652,506, filed on Apr. 4, 2018, provisional application No. 62/630,592, filed on Feb. 14, 2018, provisional application No. 62/615,815, filed on Jan. 10, 2018.

(51) Int. Cl.
  *H04L 27/26* (2006.01)
  *H04W 16/14* (2009.01)
  *H04W 72/21* (2023.01)

(52) U.S. Cl.
  CPC ......... *H04L 27/2634* (2013.01); *H04W 16/14* (2013.01); *H04W 72/21* (2023.01); *H04L 5/0048* (2013.01)

(58) Field of Classification Search
  CPC . H04W 72/23; H04W 72/231; H04W 72/232; H04W 84/02; H04W 88/06; H04W 88/10; H04W 92/02; H04W 92/10
  See application file for complete search history.

(56) References Cited

U.S. PATENT DOCUMENTS

| | | | |
|---|---|---|---|
| 10,129,857 | B2 | 11/2018 | Sun et al. |
| 10,397,905 | B2 | 8/2019 | Han et al. |
| 2011/0045860 | A1 | 2/2011 | Nam et al. |
| 2014/0029558 | A1 | 1/2014 | Frederiksen et al. |
| 2016/0036578 | A1 | 2/2016 | Malladi et al. |
| 2016/0174214 | A1 | 6/2016 | Yerramalli et al. |
| 2016/0226644 | A1 | 8/2016 | Gaal et al. |
| 2017/0164352 | A1 | 6/2017 | Yang et al. |
| 2017/0245263 | A1 | 8/2017 | Li et al. |
| 2017/0245302 | A1 | 8/2017 | Mukherjee et al. |
| 2017/0310444 | A1 | 10/2017 | Chung et al. |
| 2018/0076917 | A1 | 3/2018 | Pan et al. |
| 2019/0045491 | A1* | 2/2019 | Zhang ................. H04W 72/232 |
| 2019/0373613 | A1* | 12/2019 | Harada ................. H04L 5/0005 |
| 2020/0068617 | A1 | 2/2020 | Yoon et al. |
| 2020/0177423 | A1* | 6/2020 | Gao .................... H04J 13/0059 |

FOREIGN PATENT DOCUMENTS

| | | |
|---|---|---|
| WO | 2017/149071 | 9/2017 |
| WO | 2017/155273 | 9/2017 |

OTHER PUBLICATIONS

Budisin, "Efficient Pulse Compressor for Golay Complementary Sequences," Electronics Letters, vol. 27, No. 3 (Jan. 31, 1991).
Holzmann et al., "A computer search for complex Golay sequences," Australas. J Comb., 10, 251-258 (1994).
IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, IEEE P802.11ad-2012 (Dec. 2012).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Intel Corporation, "Enhancements to NR UL signals and channels for unlicensed operation," 3GPP TSG RAN WG1 Meeting #94, R1-1808684, Gothenburg, Sweden (Aug. 20-24, 2018).
Interdigital Inc., "Discussion on potential waveform solutions for NR unlicensed," 3GPP TSG RAN WG1 Meeting #92, R1-1802646, Athens, Greece (Feb. 26-Mar. 2, 2018).
Interdigital Inc., "On Potential Waveform Solutions for NR-U," 3GPP TSG RAN WG1 Meeting #92bis, R1-1804884, Sanya, China (Apr. 16-20, 2018).
Interdigital Inc., "On UL Physical Layer Channel Design for NRR-U," 3GPP TSG RAN WG1 Meeting #92b, R1-1804869, Sanya, China (Apr. 16-20, 2018).
Interdigital Inc., "On UL Signals and Channels in NR-Unlicensed," 3GPP TSG RAN WG1 Meeting #93, R1-1807035, Busan, Korea (May 21-25, 2018).
Interdigital Inc., "On Uplink Signals and Channels for NR-U," 3GPP TSG RAN WG1 Meeting #94, R1-1809088, Gothenburg, Sweden (Aug. 20-24, 2018).
Nokia et al., "On uplink signal and channel structures for NR-U," 3GPP TSG RAN WG1 Meeting #94, R1-1808818, Gothenburg, Sweden (Aug. 20-24, 2018).
Parker et al., "Golay Complementary Sequences," pp. 1-18 (Jan. 19, 2004).
Qualcomm Incorporated, "Channelization of 1-symbol short PUCCH with 1 or 2 bits payload," 3GPP TSG RAN WG1 Meeting #90b, R1-1718559, Prague, CZ (Oct. 9-13, 2017).
Qualcomm, "Channelization of 1-symbol short PUCCH with more than 2 bits payload," 3GPP TSG RAN WG1 NR Ad-Hoc#2, R1-1711189, Qingdao, China (Jun. 27-30, 2017).
Third Generation Partnership Project, "Technical Specification Group Radio Access Network; NR; Physical channels and modulation (Release 15)," 3GPP TS 38.211 V15.0.0 (Dec. 2017).
Third Generation Partnership Project, "Technical Specification Group Radio Access Network; NR; Physical channels and modulation (Release 15)," 3GPP TS 38.211 V15.3.0 (Sep. 2018).
Third Generation Partnership Project, "Technical Specification Group Radio Access Network; NR; Physical layer procedures for control (Release 15)," 3GPP TS 38.213 V15.0.0 (Dec. 2017).
Third Generation Partnership Project, "Technical Specification Group Radio Access Network; NR; Physical layer procedures for control (Release 15)," 3GPP TS 38.213 V15.3.0 (Sep. 2018).
ZTE, "sPUCCH format design," 3GPP TSG RAN WG1 Meeting #90, R1-1712326, Prague, Czech Republic (Aug. 21-25, 2017).

* cited by examiner

SHORT PHYSICAL UPLINK CONTROL CHANNEL (sPUCCH) STRUCTURE

CROSS-REFERENCE TO RELATED APPLICATIONS

This application is a continuation of U.S. patent application Ser. No. 16/960,937 filed on Jul. 9, 2020 which is a national stage application of PCT/US2019/012893 filed on Jan. 9, 2019, which claims the benefit of priority to U.S. Provisional Applications U.S. 62/652,506 filed Apr. 4, 2018, U.S. 62/630,592 filed Feb. 14, 2018 and U.S. 62/615,815 filed Jan. 10, 2018, which are incorporated by reference as if fully set forth herein.

BACKGROUND

Next generation mobile communications and applications may utilize enhanced mobile broadband (eMBB), massive machine type communication (mMTC), ultra-reliable low latency communications (URLLC), or the like. In 5G new radio (NR), a physical uplink control channel (PUCCH) may be communicated over an unlicensed, license exempt, or the like carrier or band. Similar to NR licensed short PUCCH (sPUCCH), sequences may need to be communicated to convey one or more messages or control information. Since sPUCCH symbols may be transmitted within a short period of duration, high power levels may be utilized to increase symbol energy while maintaining a low peak to average power ratio (PAPR). Having sequences with low PAPR for unlicensed communications with interlacing may be desirable.

SUMMARY

In network communications, a Golay modulator may be configured to receive one or more outputs of fragmented components of modulated control information and may generate a Golay sequence. The Golay sequence may be provided to an inverse discrete Fourier transform (IDFT) component that may apply an IDFT operation to the Golay sequence. In addition, a wireless transmit/receive unit (WTRU) may be configured to select a base sequence and a cyclic shift to apply to the base sequence. An index of the base sequence and cyclic shift may be signaled to the WTRU.

In one aspect, a wireless transmit/receive unit (WTRU) may receive a downlink transmission and send a physical uplink control channel (PUCCH) transmission in each resource block (RB) of an interlace of a plurality of RBs in an active bandwidth part (BWP). A base sequence is mapped to the PUCCH transmission repetitively, once to each RB of the plurality of RBs of the interlace, using a different cyclic shift of the base sequence for each RB. Each different cyclic shift of the base sequence in the PUCCH transmission to each RB is a function of a RB index of the respective RB. The PUCCH transmission indicates either an acknowledgement (ACK) or a negative ACK (NACK) of the received downlink transmission.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Example Networks for Implementation of the Embodiments

Figure 1A:
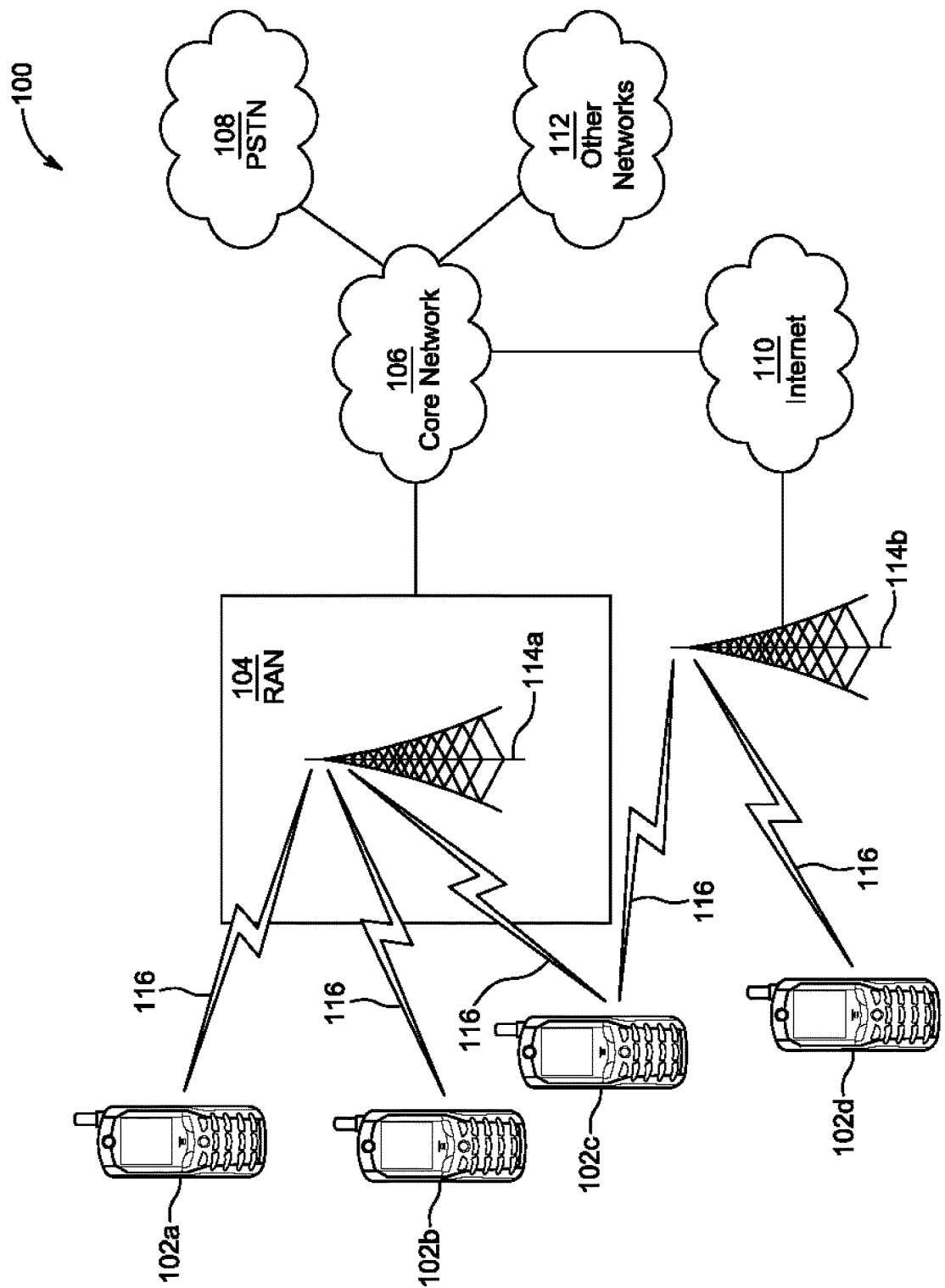
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA-F). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
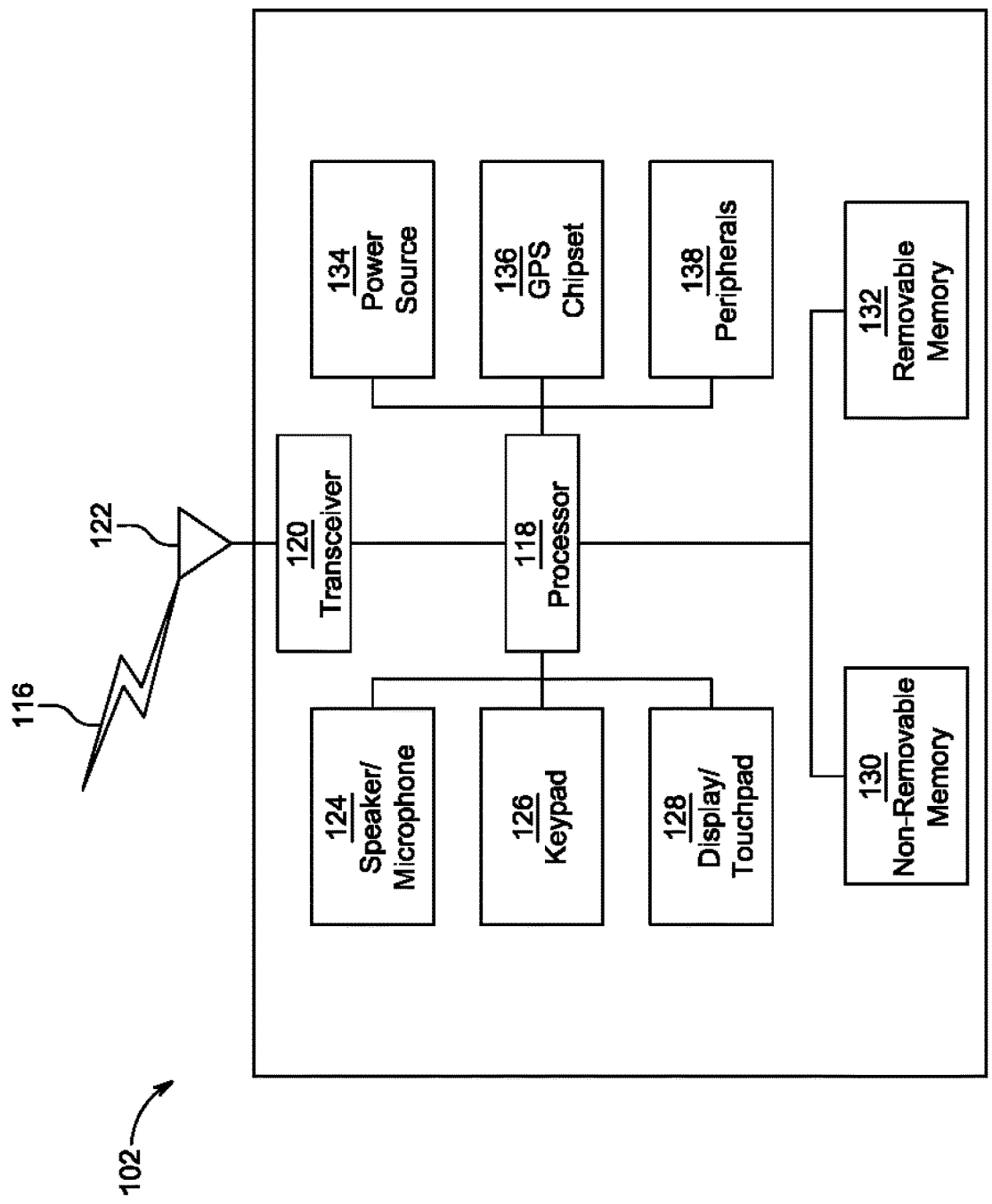
FIG. 1B is a system diagram illustrating an example wireless transmit/receive unit (WTRU) that may be used within the communications system illustrated in FIG. 1A according to an embodiment.
Figure 1C:
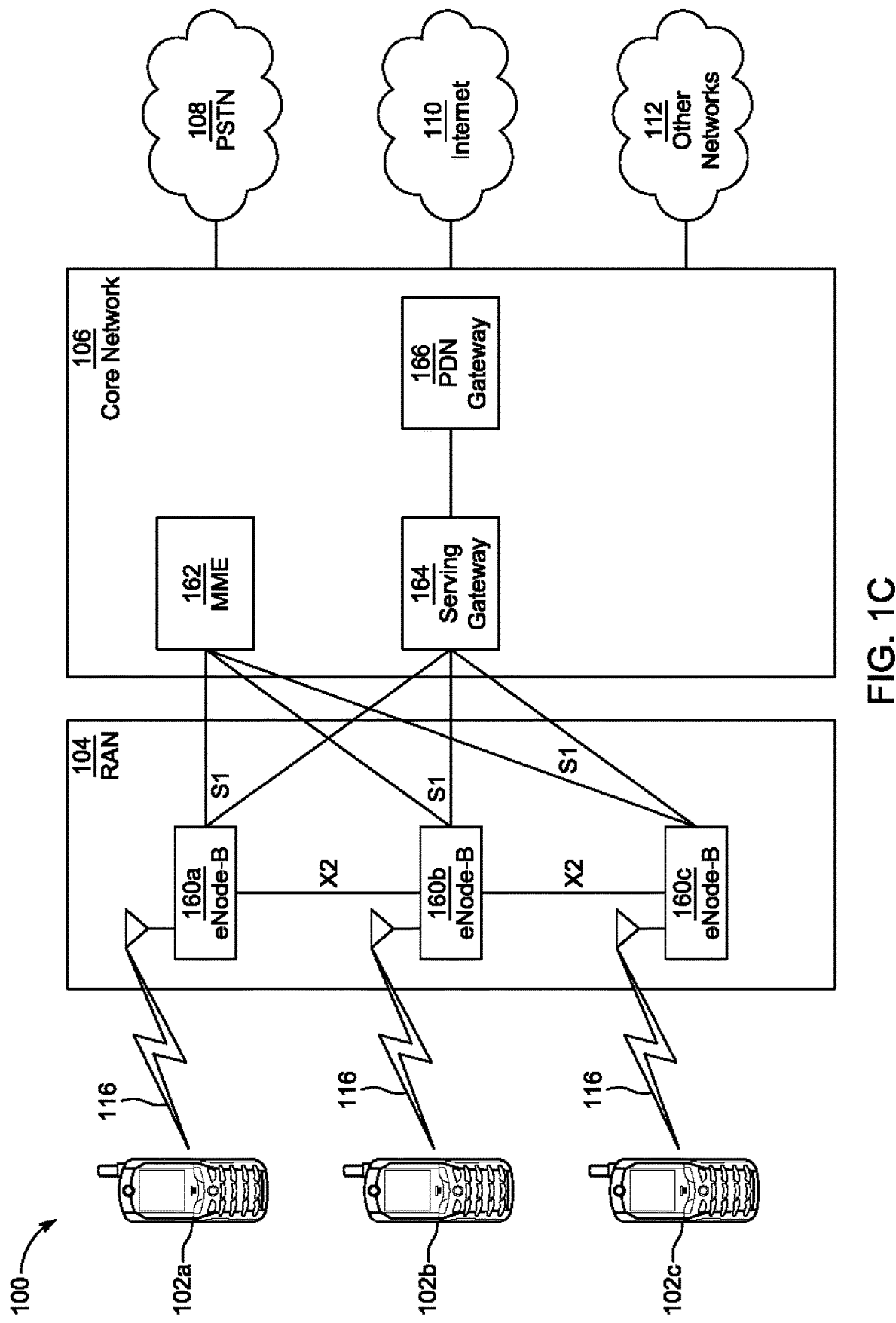
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (10), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 18 depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Figure 18:
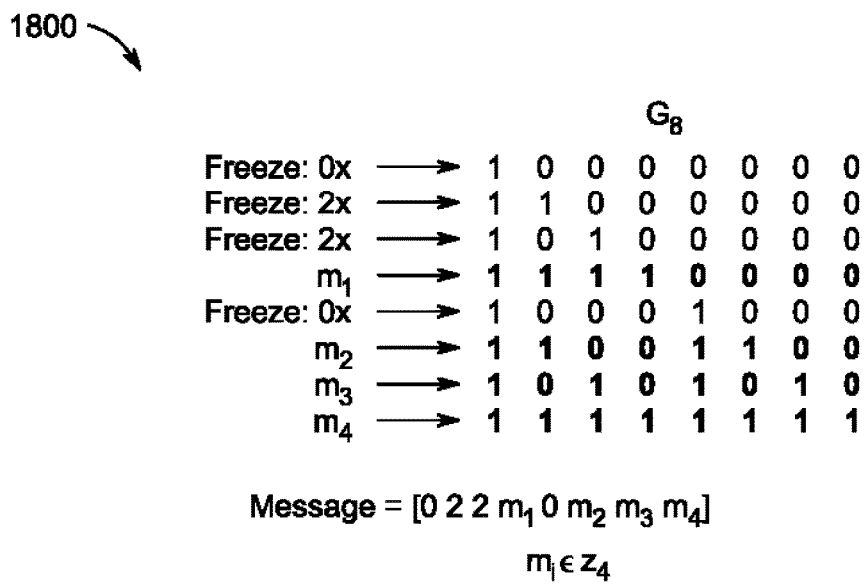
FIG. 18 is an example of a table for generating QPSK symbols for a Golay modulator with a polar encoder.

Although the transmit/receive element 122 is depicted in FIG. 18 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
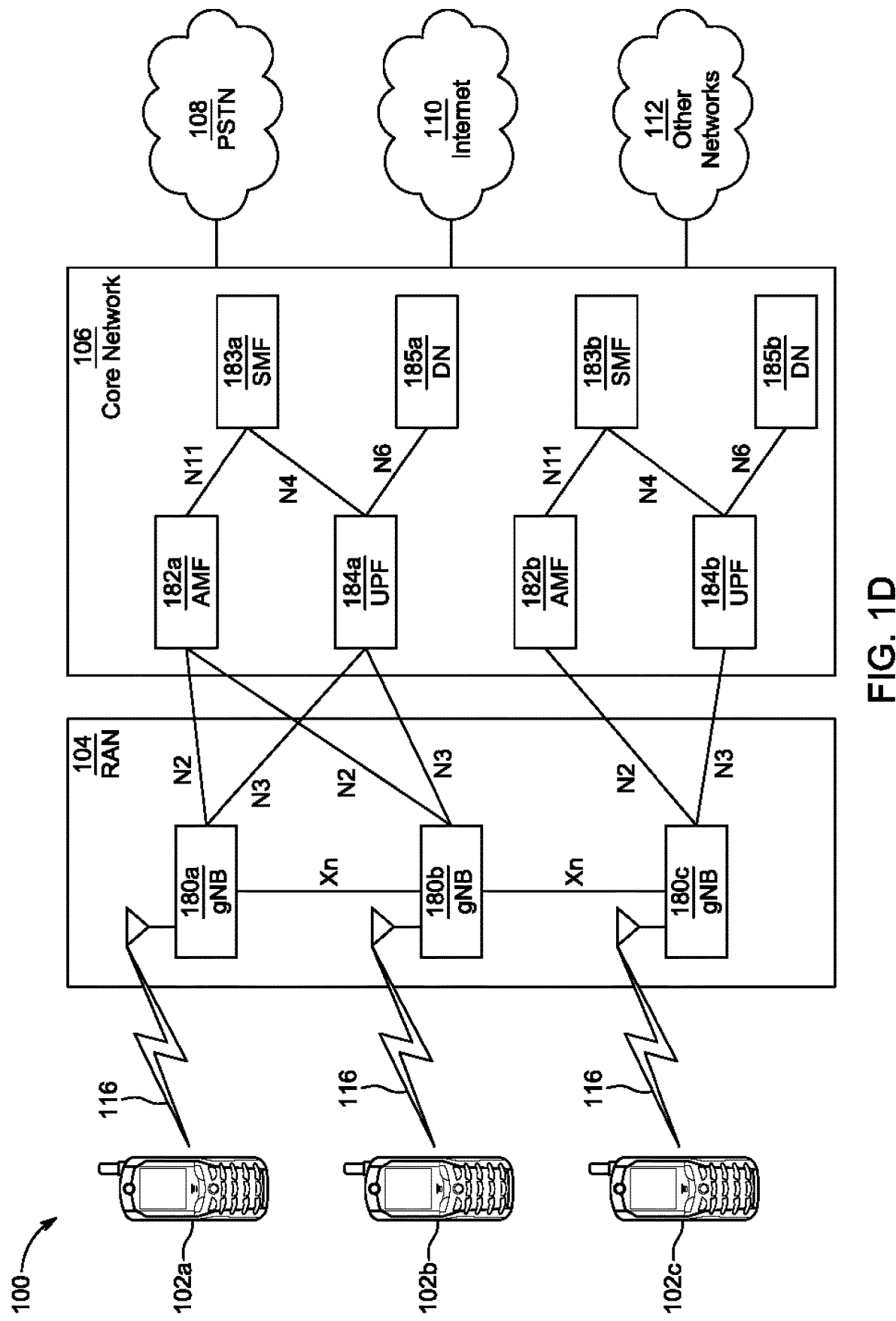
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Description of Embodiments

Licensed assisted access (LAA), enhanced LAA (eLAA), or the like is a mode of operation for wireless, cellular, or network providers to integrate unlicensed spectrum into wireless networks utilizing LTE, LTE-A, 3G, 4G, 5G, 6G, or the like. While LAA may be downlink-only, eLAA is capable of uplink and downlink operation in unlicensed or license exempt bands. LAA may utilize listen before talk (LBT) protocol in various categories. A category 1 may operate without LBT. A category 2 may operate using LBT without random back-off such that the duration of time that the channel is sensed to be idle before the transmitting entity transmits may be deterministic.

A category 3 may operate using LBT with random back-off with a contention window of fixed size that may draw a random number N within a contention window. A random number N may be used in LBT to determine the duration of time that the channel is sensed to be idle before transmitting on a channel. A channel may be a logical, transport, physical, or the like channel. The size of the contention window may also be a minimum value of N, a maximum value of N, fixed, or the like.

A category 4 may correspond to LBT with random back-off with a contention window of variable size that may draw a random number N within a contention window. The size of a contention window may be specified by a minimum value of N, a maximum value of N, or the like. A size of the contention window may also vary when drawing random number N.

A device may perform random back-off such that different channel access priority classes and corresponding parameters, as defined in Error! Reference source not found. where p is the priority class index. The defer duration $T_d$ consists of duration $T_f=16$ us immediately followed by m p consecutive slot durations where each slot duration is $T_{sl}=9$ us $CW_{min,p}$ and $CW_{max,p}$ define the minimum and maximum size of contention window. The eNB shall not continuously transmit on a carrier on which the LAA Scell(s) transmission(s) are performed, for a period exceeding $T_{mcot,p}$, or any other parameter.

TABLE 1

| Channel Access Priority Class (p) | $m_p$ | $CW_{min,p}$ | $CW_{max,p}$ | $T_{m\,cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

Interlace transmission or resource allocation may be utilized in LAA. A basic unit of resource allocation for unlicensed data channels may be an interlace that includes a number of substantially equally spaced resource blocks within a frequency bandwidth. For instance, the number may be 10. An interlace structure in frequency may be needed due to regulations in an unlicensed band to allow WTRUs to utilize maximum available transmit power. An interlace, for example, may comprise 120 subcarriers of an OFDM symbol and the subcarriers may be distributed in a clustered manner where each cluster size is 12 and the clusters are apart from each other by 9×12 subcarriers. In addition, for certain LAA or eLAA configurations an interlace resource allocation may be utilized for data channels only, a control channel may be transmitted using a licensed band, a control channel may be transmitted using a physical uplink control channel (PUCCH) in a licensed band, or the like.

Figure 2:
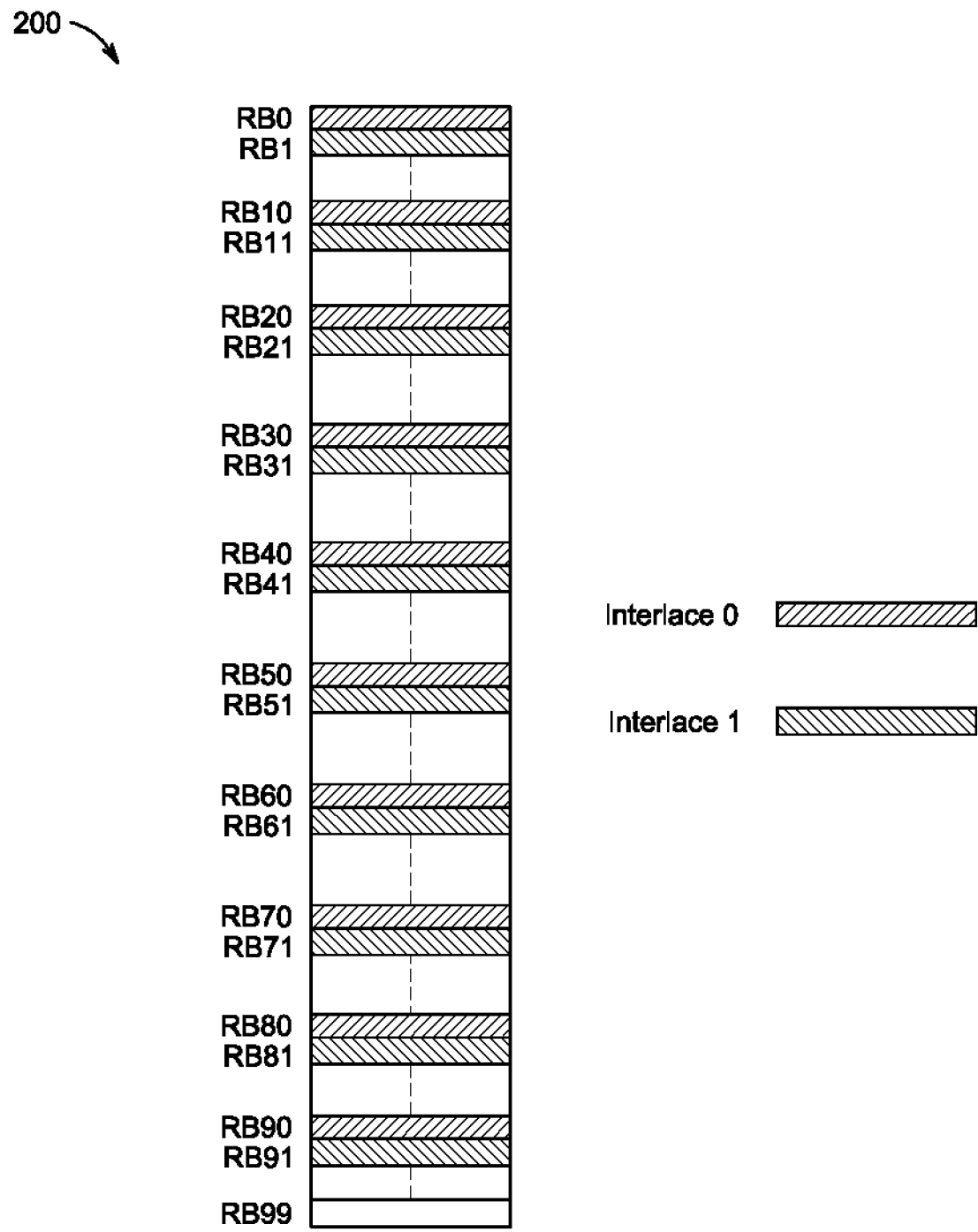
FIG. 2 is a diagram of interlacing.

MulteFire is a technology that may be configured to operate in the unlicensed band. Wi-Fi, 802.11x, or any other LAN technology may utilize MulteFire. MulteFire may operate similar to LAA or eLAA and use LBT protocol. FIG. 2 is a diagram of interlacing 200 that may be configured for MulteFire or LTE for different channels, different PUCCHs, different PUCCH formats, or the like. Interlacing 200 may comprise Interlace 0 and Interlace 1 for resource blocks (RBs) or physical RBs (PRBs) 0-99. In MulteFire, short PUCCH (sPUCCH) for format 0 may send scheduling requests by using a cyclically-padded Zadoff-Chu sequence. This configuration may undesirably have high PAPR, arbitrary complex numbers with unit amplitude, or the like.

NR numerology on unlicensed spectrum may be based on frequency such as 5 GHz, 37 GHz, 60 GHz, or the like. Configurations where NR-LAA is anchored to a legacy LTE carrier by DC and CA based aggregation with a 5G NR anchor may be utilized by standalone and non-standalone NR.

In NR, sPUCCH 0, 1, or 2 bits may be transmitted by mapping a specific sequence to one RB, PRB, or the like in the frequency domain. Each sequence may be of length-12 and include quadrature phase shift keying (QPSK) symbols. Although certain examples herein may refer to QPSK, any modulation scheme may be configured or utilized for given embodiments. WTRUs in a cell transmitting on the same RB, PRB, or the like using the same base sequence may apply different cyclic shifts to the base sequence. WTRUs in neighboring cells may use different base sequences to minimize inter-cell interference.

A base sequence may be given by $$r_u(n) = \exp\left(\frac{j\varphi(n)\pi}{4}\right),$$

where φ(n) is given in Table 2, where u is the sequence index, such as from 0 to 29, and n=0, . . . , 11. Although any number of base sequences may be configured as desired for the examples given herein, Table 2 is one of many configurations with 30 base sequences.

TABLE 2

| u | $\varphi(0), \ldots, \varphi(11)$ | | | | | | | | | | | |
|---|---|---|---|---|---|---|---|---|---|---|---|---|
| 0  |  1 | −1 |  3 |  1 |  1 | −1 | −1 | −1 |  1 |  3 | −3 |  1 |
| 1  | −1 | −1 | −1 | −1 |  1 | −3 | −1 |  3 |  3 | −1 | −3 |  1 |
| 2  | −3 |  1 | −3 | −3 | −3 |  3 | −3 | −1 |  1 |  1 |  1 | −3 |
| 3  | −3 |  3 |  1 |  3 | −3 |  1 |  1 |  1 |  1 |  3 | −3 |  3 |
| 4  | −3 |  1 |  3 | −1 | −1 | −3 | −3 | −1 | −1 |  3 |  1 | −3 |
| 5  | −1 |  1 |  1 | −1 |  1 |  3 |  3 | −1 | −1 | −3 |  1 | −3 |
| 6  | −3 | −3 | −1 |  3 |  3 |  3 | −3 |  3 | −3 |  1 | −1 | −3 |
| 7  | −3 |  3 | −3 |  3 |  3 | −3 | −1 | −1 |  3 |  3 |  1 | −3 |
| 8  | −3 | −1 | −3 | −1 | −1 | −3 |  3 |  3 | −1 | −1 |  1 | −3 |
| 9  | −3 |  3 |  3 |  3 | −1 | −3 | −3 | −1 | −3 |  1 |  3 | −3 |
| 10 |  1 |  3 | −3 |  1 |  3 |  3 |  3 |  1 | −1 |  1 | −1 |  3 |
| 11 | −1 | −3 |  3 | −1 | −3 | −3 | −3 | −1 |  1 | −1 |  1 | −3 |
| 12 |  3 |  1 |  3 |  1 |  3 | −3 | −1 |  1 |  3 |  1 | −1 | −3 |
| 13 | −3 | −3 |  3 |  3 |  3 | −3 |  1 | −3 |  3 |  1 | −3 |  3 |
| 14 | −3 | −1 |  1 | −3 |  1 |  3 |  3 | −3 | −1 | −3 |  3 |  3 |
| 15 | −3 | −1 |  3 |  1 | −3 | −3 | −3 | −1 |  3 | −1 |  1 |  3 |
| 16 | −1 |  1 |  3 | −3 |  1 | −1 |  1 | −1 | −1 | −3 |  1 | −1 |
| 17 | −3 | −1 | −1 |  1 |  3 |  1 |  1 | −1 |  1 | −1 | −3 |  1 |
| 18 | −3 | −1 |  3 | −3 | −3 | −1 | −3 |  1 | −1 | −3 |  3 |  3 |
| 19 | −3 | −3 |  3 | −3 | −1 |  3 |  3 |  3 | −1 | −3 |  1 | −3 |
| 20 | −3 |  1 | −1 | −1 |  3 |  3 | −3 | −1 | −1 | −3 | −1 | −3 |
| 21 | −3 |  1 |  3 |  3 | −1 | −1 | −3 |  3 |  3 | −3 |  3 | −3 |
| 22 | −3 | −1 | −1 | −3 | −3 | −1 | −3 |  3 |  1 | −3 | −1 | −3 |
| 23 | −3 | −1 |  3 |  1 | −3 | −1 | −3 |  3 |  1 |  3 |  3 |  1 |
| 24 | −3 |  3 |  3 |  1 | −3 |  3 | −1 |  1 |  3 | −3 |  3 | −3 |
| 25 |  3 | −1 | −3 |  3 | −3 | −1 |  3 |  3 |  3 | −3 | −1 | −3 |
| 26 |  1 | −1 |  3 | −1 | −1 | −1 | −3 | −1 |  1 |  1 |  1 | −3 |
| 27 | −3 |  3 |  1 | −3 |  1 |  3 | −1 | −1 |  1 |  3 |  3 |  3 |
| 28 | −3 |  3 | −3 |  3 | −3 | −3 |  3 | −1 | −1 |  1 |  3 | −3 |
| 29 | −3 |  3 |  1 | −1 |  3 |  3 | −3 |  1 | −1 |  1 | −1 |  1 |

Aperiodic Auto Correlation (APAC) may be derived by $\rho_a(k)$ for $k \in [-N+1, N-1]$ being the aperiodic autocorrelation of a complex sequence $a=[a_0, a_1, \ldots, a_{N-1}]$ and $\rho_a(k)$ given by:

$$\rho_a(k) = \begin{cases} \rho_a^+(k), & k \in [0, N-1] \\ \rho_a^-(-k), & k \in [-N+1, -1] \end{cases} \qquad \text{Eq. (1)}$$

where $$\rho_a^+(k) = \sum_{i=0}^{N-k-1} a_i^* a_{i+k}, \quad 0 \le k \le N-1 \qquad \text{Eq. (2)}$$

and $$\rho_a^-(k) = \sum_{i=0}^{N-k-1} a_i a_{i+k}^*, \quad 0 \le k \le N-1 \qquad \text{Eq. (3)}$$

where $(\cdot)^*$ is the conjugate of its argument and $\rho_a^+(k) = [\rho_a^-(k)]^*$.

Periodic Auto Correlation (PAC) may be determined by $r_a(k)$ being the periodic autocorrelation of the sequence $a = \{a_0, a_1, \ldots, a_{N-1}\}$ and $r_a(k)$ being explicitly given by $$r_a(k) \triangleq \sum_{i=0}^{N-1} a_i^* a_{(i+k)_N}, \quad 0 \le k \le N-1, \qquad \text{Eq. (4)}$$

where $(i)_N$ is the modulo of i.

A Golay modulator may apply a non-coherent, coherent, concatenation based, or an overlapping based technique to generate a Golay sequence. In certain configurations, a Golay modulator may be realized using a channel code. Also, UCI bits may be mapped to a set of interleaved subcarriers. Golay complementary sequences may be determined such that the pair of (a, b) is called a Golay complementary pair (or sequences) if $$\rho_a(k) + \rho_b(k) = 0, k \ne 0. \qquad \text{Eq. (5)}$$

Golay complementary pairs and sequences may be used for peak-to-average power mitigation or minimization, estimation of in-phase/quadrature (IQ) imbalance parameters, or channel estimation due to desirable properties. Golay complementary sequence construction for larger lengths may be determined such that the length $N = 2^M$ of Golay complementary pairs may be constructed by a recursive procedure:

$$a_k^{(m)} = w_m a_k^{(m-1)} + b_{k-d_m}^{(m-1)} \qquad \text{Eq. (6)}$$

$$b_k^{(m)} = w_m a_k^{(m-1)} - b_{k-d_m}^{(m-1)} \qquad \text{Eq. (7)}$$

where $a_k^{(0)} = a_k^{(1)} = \delta_k$, $\delta_k$ is the Kronecker's delta, and $w_m$ is the $m^{th}$ element of rotation vector $w = [w_1 \, w_2 \ldots w_M]$, where $|w_m| = 1$, $d_m$ is the $m^{th}$ element of the delay vector $d = [d_1 \, d_2 \ldots d_m]$ and the permutation of $[1 \, 2 \ldots 2^M]$.

Pairs of Golay complementary sequences may be configured as $(Ga_{32}, Gb_{32})$, $(Ga_{64}, Gb_{64})$, and $(Ga_{128}, Gb_{128})$. The parameters of these pairs may be listed as follows:

$$Ga_{32} = \text{flip}\{a_k^{(5)}\} \text{ and } Gb_{32} = \text{flip}\{b_k^{(5)}\}: w = [-1 \, 1 \, -1 \, 1 \, -1] \text{ and } d = [1 \, 4 \, 8 \, 2 \, 16] \qquad \text{Eq. (8)}$$

and $$Ga_{64} = \text{flip}\{a_k^{(6)}\} \text{ and } Gb_{64} = \text{flip}\{b_k^{(6)}\}: w = [1 \, 1 \, -1 \, -1 \, 1 \, -1] \text{ and } d = [2 \, 1 \, 4 \, 8 \, 16 \, 32] \qquad \text{Eq. (9)}$$

and $$Ga_{128} \, \text{flip}\{a_k^{(7)}\} \text{ and } Gb_{128} = \text{flip}\{b_k^{(7)}\}: w = [-1 \, -1 \, -1 \, -1 \, 1 \, -1 \, -1] \text{ and } d = [1 \, 8 \, 2 \, 4 \, 16 \, 32 \, 64] \qquad \text{Eq. (10)}$$

where flip$\{\cdot\}$ reverses the order of its argument. In addition to a short training field (STF) and channel estimation field (CEF) in 802.11xx, Golay sequences may be used in a single carrier physical (PHY) and low power SC PHY for a guard interval (GI), in a beamforming training (TRN) field, or the like. Furthermore, Golay complementary sequences with the alphabet of $\{1, -1\}$ may exist for all lengths $N = 2^n 10^m 26^k$ for non-negative integers n, m and k.

A Time-Domain Power Signal as a function of APAC may be a sequence with a polynomial as $$x_a(z) = a_{N-1} z^{N-1} + a_{N-2} z^{N-2} + \cdots + a_0 \qquad \text{Eq. (11)}$$

where the sequence $a = [a_0, a_1, \ldots, a_{N-1}]$. PAPR may be measured if $z = e^{j2\pi t}$, $x_a(z)$ is equivalent to an OFDM signal in time, or Fourier transform of a, $z = e^{j2\pi t}$, the instantaneous power can be calculated as $|x_a(z)|^2 = x_a(z) x_{a*}(z^{-1})$ as $x_{a*}(z^{-1}) = x_a^*(z)$, or instantaneous power is known.

When $|x_a(z)|^2 = x_a(z) x_{a*}(z^{-1})$ is related to APAC of the sequence, it may be expressed as follows:

$$|x_a(z)|^2 \big|_{z = e^{j2\pi t}} \equiv \qquad \text{Eq. (12)}$$

$$x_a(z) x_{a*}(z^{-1}) = \rho_a(0) + \sum_{k=1}^{N-1} \rho_a^+(k) z^k + \sum_{k=1}^{N-1} \rho_a^-(k) z^{-k} =$$

-continued $$\rho_a(0) + \sum_{k=1}^{N-1} \rho_a^+(k)e^{j2\pi tk} + \sum_{k=1}^{N-1} \rho_a^-(k)e^{-j2\pi tk} =$$

$$\rho_a(0) + 2\sum_{k=1}^{N-1} |\rho_a^+(k)|\cos(2\pi tk + \angle \rho_a^+(k)) = \sum_{k=-N+1}^{N-1} \rho_a(k)e^{j2\pi tk}$$

A sequence may have ideal APAC properties when $$|x_a(e^{j2\pi t})|^2 = \rho_a(0)$$

(i.e., a constant) true. An ideal sequence may include the property of being unimodal in every point in time. With Eq. 12, the PAPR of a sequence may be bounded as:

$$PAPR \triangleq \frac{\max(x_a(z)x_{a^*}(z^{-1}))}{E[x_a(z)x_{a^*}(z^{-1})]} < \frac{\rho_a(0) + 2\sum_{k=1}^{N-1}|\rho_a^+(k)|}{\rho_a(0)} \quad \text{Eq. (13)}$$

where $E[\cdot]$ is the integration operation for t from 0 to $2\pi$.

PAPR may be measured by an integrated sidelobe level (ISL) and merit factor (MF) of a sequence determined by $$\text{Integrated sidelobe level } (ISL) \triangleq \sum_{k=1}^{N-1} |\rho_a^+(k)|^2 \quad \text{Eq. (14)}$$

and $$\text{Merit factor } (MF) \triangleq \frac{\rho_a^+(0)^2}{2\sum_{k=1}^{N} |\rho_a^+(k)|^2} \quad \text{Eq. (15)}$$

respectively.

The PAPR of a sequence of a complementary pair of sequences may be less a certain level or threshold. Since Golay pairs a and b may satisfy $\rho_a(k)+\rho_b(k)=0$, $k\neq 0$, the following may be true $$x_a(z)x_{a^*}(z^{-1}) + x_b(z)x_{b^*}(z^{-1}) = \quad \text{Eq. (16)}$$

$$\rho_a(0) + \sum_{k=1}^{N-1} \rho_a^+(k)z^k + \rho_a^-(k)z^{-k} + \rho_b(0) + \sum_{k=1}^{N-1} \rho_b^+(k)z^k + \rho_b^-(k)z^{-k} =$$

$$\rho_a(0) + \rho_b(0) + \sum_{k=1}^{N-1} ((\rho_a^+(k) + \rho_b^+(k))z^k + (\rho_a^-(k) + \rho_b^-(k))z^{-k}) =$$

$$\rho_a(0) + \rho_b(0) = 2N.$$

Correspondingly, the PAPR of a Golay sequence may be bounded as $$\frac{\max(x_a(z)x_a(z^{-1}))}{E[x_a(z)x_a(z^{-1})]} < \frac{\max(x_a(z)x_a(z^{-1}) + x_b(z)x_b(z^{-1}))}{E[x_a(z)x_a(z^{-1})]} = \quad \text{Eq. (17)}$$

$$\frac{2N}{\rho_a(0)} = 2.$$

In certain configurations, a Unified Property, such as Property 1, to generate Golay complementary pairs may be defined by letting a and b be Golay pairs of length N and c and d be Golay pairs of length M. Then, the following e and f sequence are Golay pairs of length $k(N-1)+\ell(M-1)+m+1$:

$$X_e(Z) = w_1 x_a(z^k)x_c(\ z^\ell) + w_2 x_b(z^k)x_d(\ z^\ell)z^m \quad \text{Eq. (18)}$$

$$x_f(z) = w_1 x_{b^*}(z^k)x_c(\ z^\ell) - w_2 x_{\bar{a}^*}(z^k)x_d(\ z^\ell)z^m \quad \text{Eq. (19)}$$

where k, $\ell$, m are integer numbers, $w_1$ and $w_2$ may be arbitrary or random complex numbers with unit amplitude, and $x_a(z^k)$ is the upsampled sequence a with the factor of k, $x_a(z^k)x_b(\ z^\ell)$ being the convolution of upsampled sequence a with the factor of k and upsampled sequence a with the factor of 1. Furthermore, $x_a(z)z^m$ may represent padded sequence a with m null symbols.

A sPUCCH may be transmitted over an unlicensed carrier, such as in NR standalone operation. Like NR licensed sPUCCH, some sequences may be transmitted to represent an acknowledgement (ACK), negative ACK (NACK), scheduling request (SR), reference signal (RS), or the like messages. When sPUCCH symbols are transmitted within a short period, high power transmission may be needed to increase symbol energy. Accordingly, sequences for sPUCCH in an unlicensed band may have low PAPR. However, constructing sequences with low PAPR for unlicensed bands may be difficult due to interlace structures as given in 200.

Figure 3:
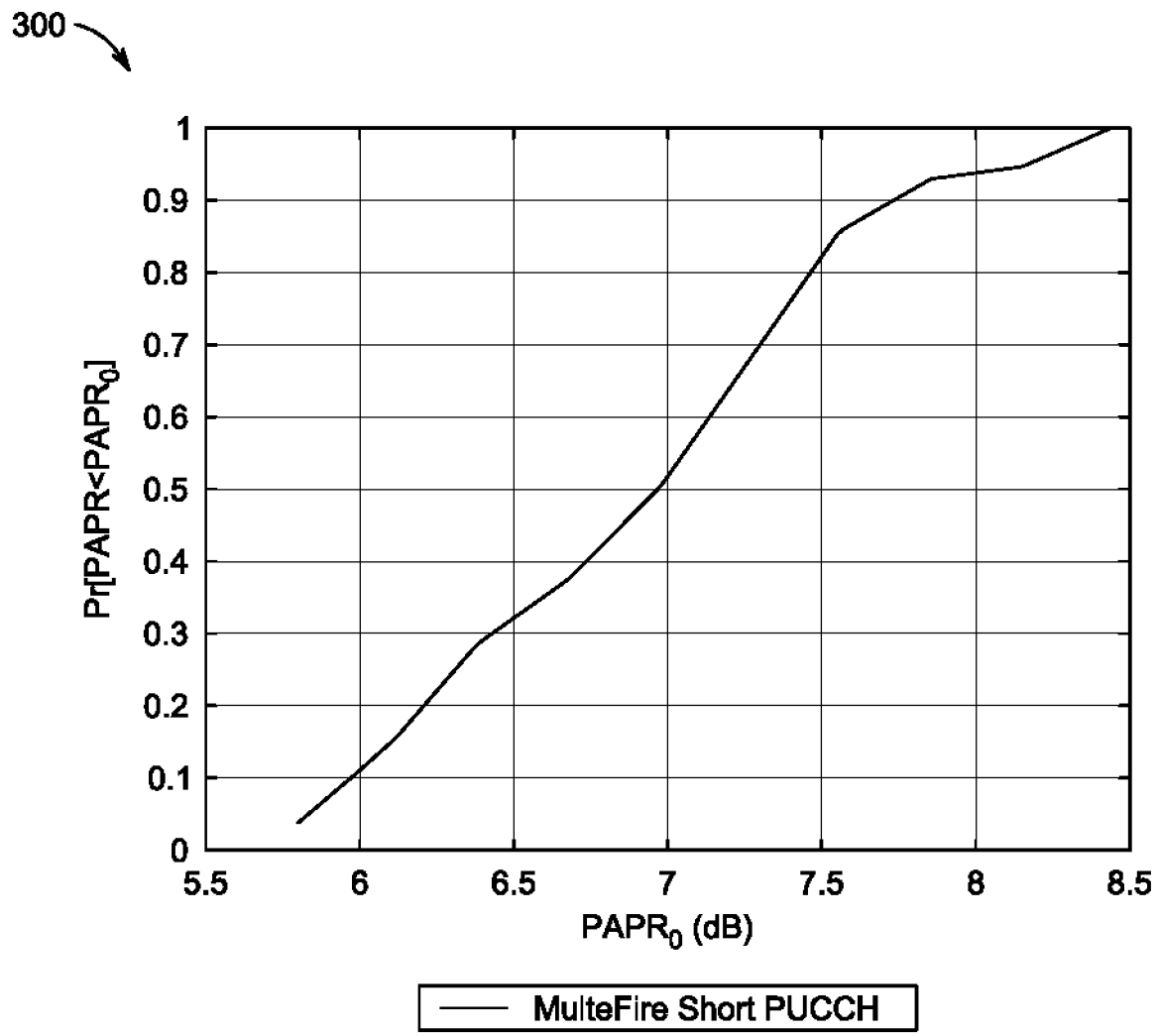
FIG. 3 is a chart of a peak to average power ratio (PAPR) distribution for a short physical uplink control channel (sPUCCH) Format 0 in MulteFire.

FIG. 3 is a chart 300 of a PAPR distribution for sPUCCH Format 0 in MulteFire. In MulteFire, sPUCCH for Format 0 SRs may utilize a cyclically-padded Zadoff-Chu sequence having undesirable PAPR properties. Additionally, this configuration may result in complexity at a receiver or transceiver due to multi or polyphases properties, such that elements of the sequence may be arbitrary or random complex numbers with unit amplitude.

A sPUCCH configuration to control the PAPR of the sequence-based sPUCCH of interlaced waveforms in the unlicensed band and decrease receiver complexity by limiting a sequence alphabet constellation may be configured or utilized. Golay sequence based interlaces may be utilized, such as for sPUCCH X bit transmissions. In certain configurations, X may be 1-2 bits. The inverse discrete Fourier transform (IDFT) of one of the sequences of one of a quinary Golay complementary pair may be transmitted to signal control information, ACK, NACK, SR, RS(s), or the like in the frequency domain. The cluster size of an interlace for sPUCCH may be $N_{rb}$ subcarriers, the interlace may have $N_{cluster}$, and the cluster may be separated by $(k-1)N_{rb}$ subcarriers, where k is a non-negative integer.

The transmitted quinary sequence in a Golay complementary pair of length of $kN_{rb}N_{cluster}$ may follow an interlace structure. For example, the elements of the sequence carried over the subcarriers may belong to the clusters that are in the constellation of QPSK, or there are $N_{rb} \times N_{cluster}$ symbols which are in a QPSK constellation, and the elements of the sequence that are not carried over the subcarriers belong to the clusters, or there are $(k-1)N_{rb} \times N_{cluster}$ null symbols. In this configuration, the PAPR of the corresponding quinary Golay sequence may be less than a predetermined target that is difficult to maintain. For instance, a target of −3 dB PAPR may be a stringent target for multiple cluster configurations but desirable since it may improve the coverage or range in the uplink and save power.

Figure 4:
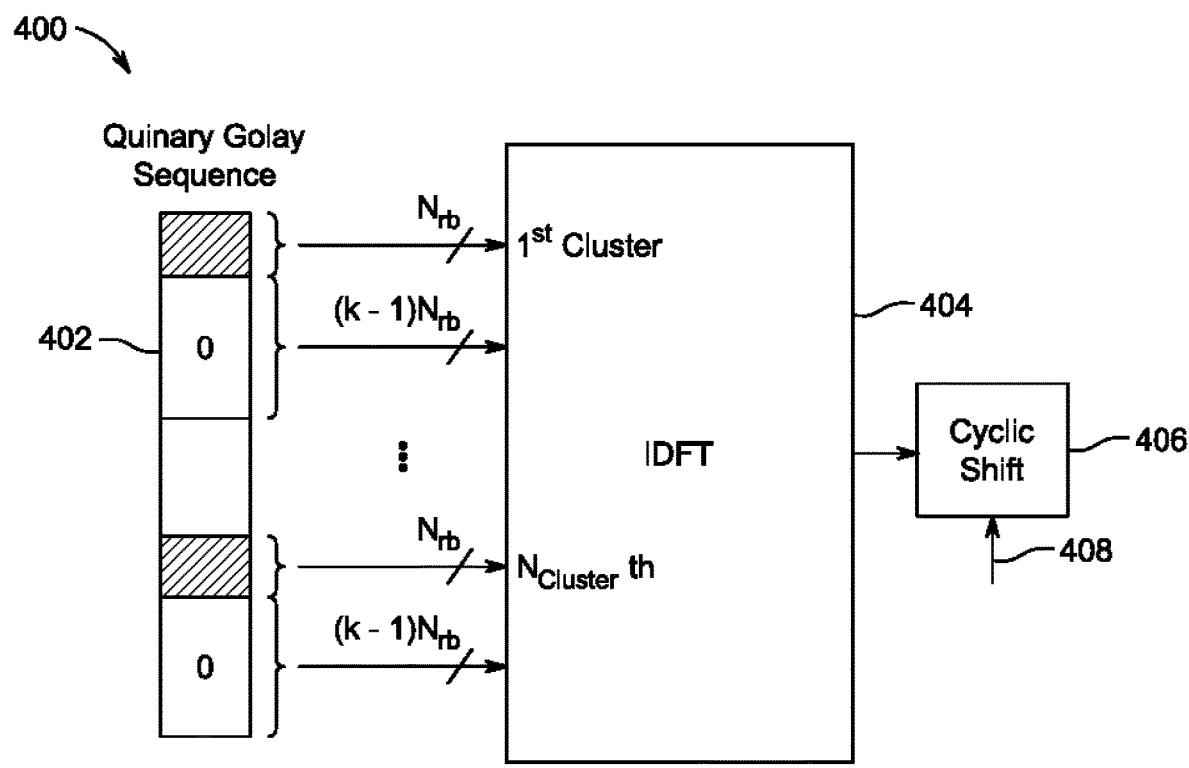
FIG. 4 is a transmitter or transceiver block diagram for interlace based on a quinary Golay-based sequence for control or PUCCH communications.

FIG. 4 is a transmitter or a transceiver block diagram 400 for interlace based on a quinary Golay sequence 402 for control or PUCCH communications. An IDFT operation 404 may be performed on the 1st cluster to $N_{Cluster}^{th}$ with the output shifted by cyclic shift unit 406 of information input or signal 408. A quinary sequence used in a PUCCH interlace may be based on various operations. For instance, interlaces in a sPUCCH may utilize a unified property to generate Golay complementary pairs, varying phase shifts to achieve different constellations, or the like.

Figure 5:
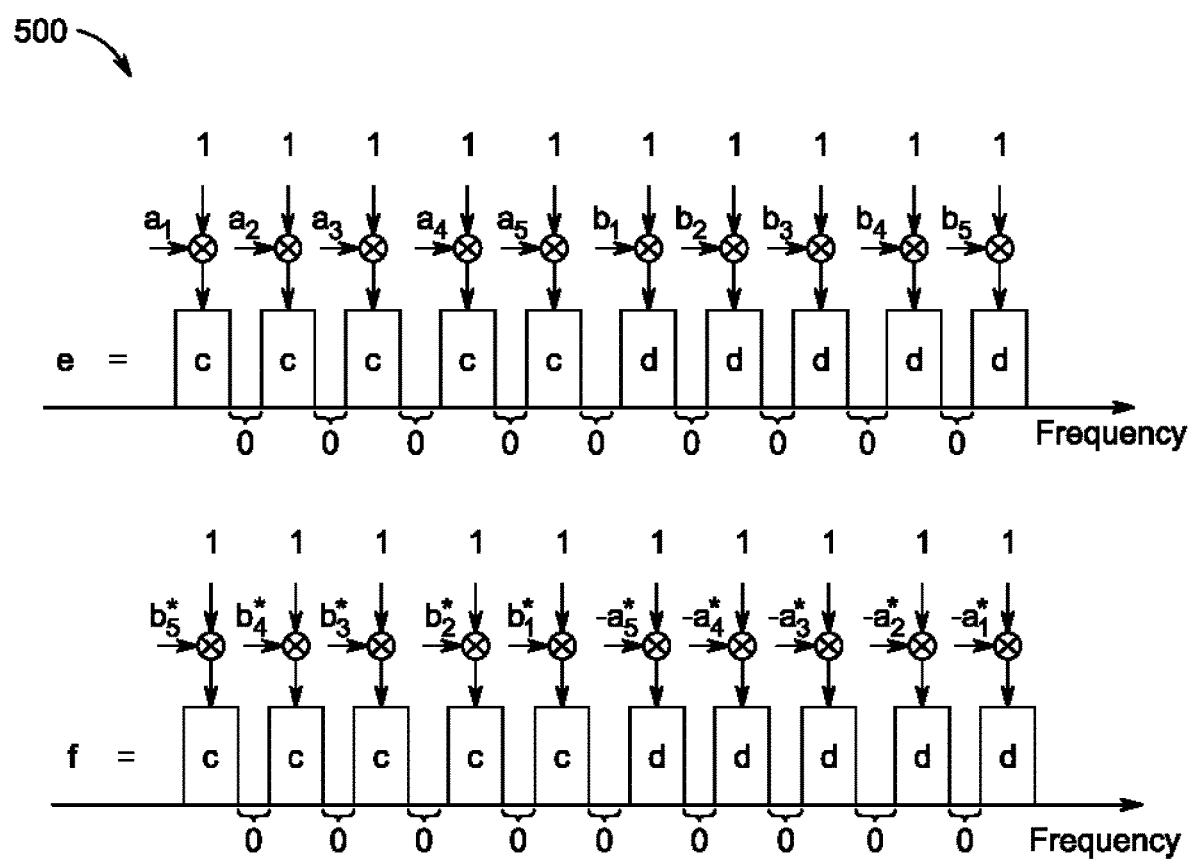
FIG. 5 is a diagram showing examples for sPUCCH interlaces.

FIG. 5 is a diagram 500 showing examples for sPUCCH interlaces. For non-coherent detection, a Golay pair (c, d) of length $N_{rb}$, where the elements of the sequences may be in a QPSK constellation, may be obtained followed by calculating padding c, d with $(k-1)N_{rb}$ null symbols and assignment to c', d'. A Golay pair (a, b) of length $N_{cluster}/2$ may be obtained followed by obtaining a quinary Golay such that:

$$X_e(Z) = x_a(z^{k'})x_c(\mathbf{z}^\ell) + x_b(z_{k'})x_d(\mathbf{z}^\ell)z^m \quad \text{Eq. (20)}$$

$$x_f(z) = x_{\tilde{b}*}(z^{k'})x_c(\mathbf{z}^\ell) - x_{\tilde{a}*}(z^{k'})x_d(\mathbf{z}^\ell)z^m \quad \text{Eq. (21)}$$

where $k'=kN_{rb}$, $\ell=1$, $m=kN_{rb}-N_{cluster}/2$, ã is the reverse of a, and a* is the conjugate of a. Furthermore, $$e = a \otimes c' | b \otimes d' \quad \text{Eq. (22)}$$

and $$f = \tilde{b}* \otimes c' | -\tilde{a}* \otimes d', \quad \text{Eq. (23)}$$

where a|b denotes the concatenation of the sequence a and the sequence b and ⊗ is a Kronecker product as illustrated in diagram 500. An interlace may utilize either e or for a combination in frequency. In a configuration with $N_{RB}=12$, $N_{cluster}=10$, and k=10, sequences a, b, c, and d may be obtained as follows: a=[1 1 1 −i i]; b=[1 i −1 1 −i]; c=[1 1 1 1 −1 −1 −1 1 i −1 1]; d=[1 1 i i 1 1 −1 1 1 −1 1 −1]; where i=. When a and b are a Golay complementary pair as (a, b), then, (a, b̃*), (ã*, b̃*), (ã*, b), (b, a) may also be Golay complementary pairs. Hence, if many sequences are desired, different combinations of a, b may be generated to generate different quinary Golay complementary pairs. In another configuration, sequences a, b may be fixed and c, d may be changed based on a table, permutated based on various properties, or the like.

Figure 19:
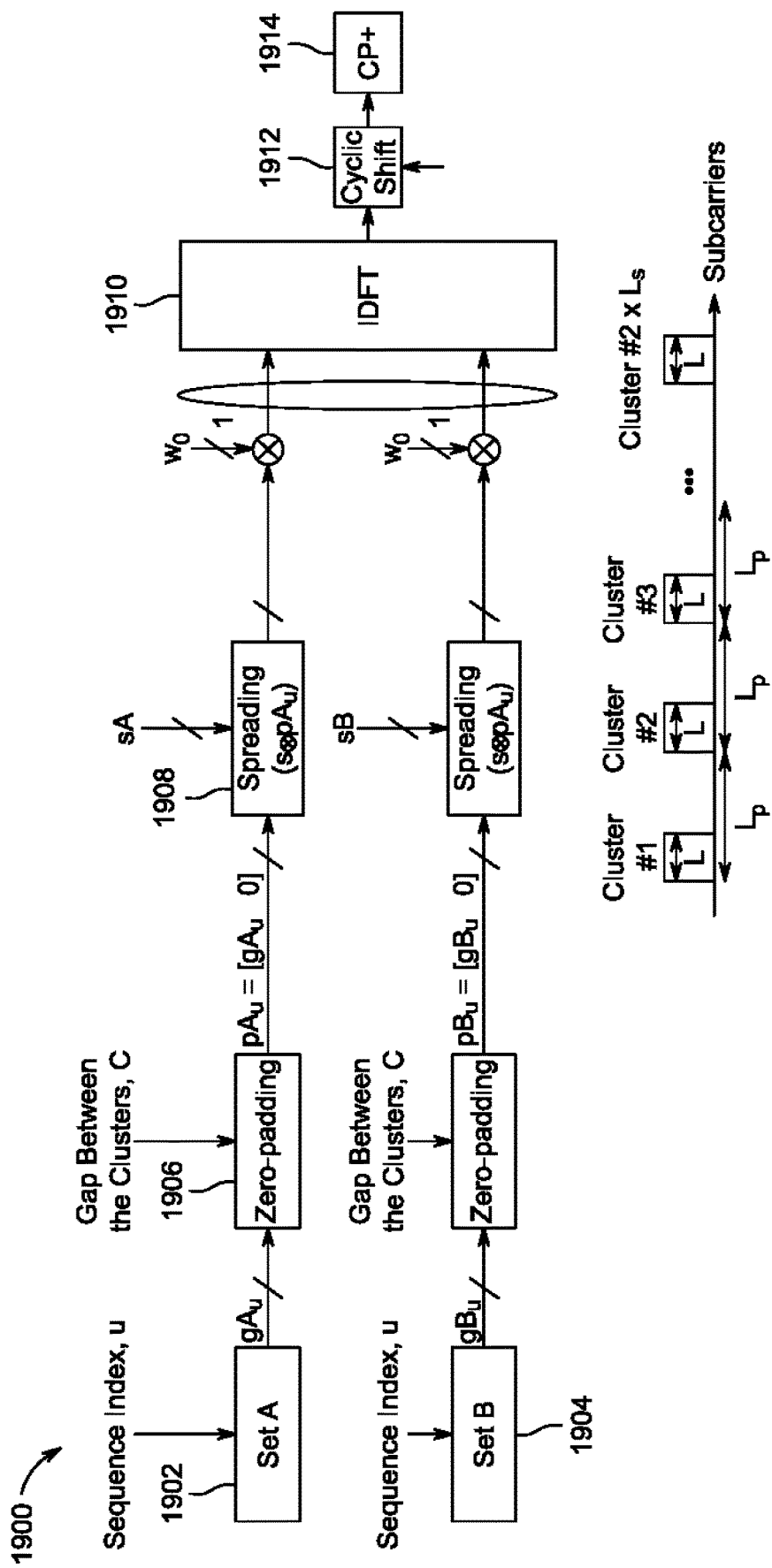
FIG. 19 is an example of a transmitter or a transceiver using clusters.

Referring now to FIG. 19, an example of a transmitter or a transceiver 1900 using clusters that may be configured to use Golay complementary pairs to keep PAPR of a corresponding signal or waveform in time less than 3 dB to transmit control information, ACK, NACK, SR, RSs, or the like is given. A Set A of sequences 1902 and Set B of sequences 1904 may be utilized based on sequence index u. As an example, Set A={$gA_u$; u=0, . . . , 29} and Set B={$gB_u$; u=0, . . . , 29} may be Golay complementary pairs and the number of sequences in each set may be 30. The cross correlation of the sequences in Set A and Set B may be low. For instance, the maximum normalized peak cross-correlation may be less than 0.75. The sequences in Set A and Set B may be generated through Table 3A and Table 3B, respectively, by calculating $$gA_u(n) = \exp\left(\frac{j\varphi_{uA}(n)\pi}{4}\right) \text{ and } gB_u(n) = \exp\left(\frac{j\varphi_{uB}(n)\pi}{4}\right),$$

where $\varphi_{uA}(n)$ and $\varphi_{uB}(n)$ are given in Table 3A and Table 3B, respectively.

As an example, Set A and Set B may comprise of sequences generated through any 30 rows of Table 3A and Table 3B, as long as the same rows in Table 3A and Table 3B, are selected (e.g., the first 30 rows in Table 3A and Table 3B may be selected). Each row in Table 3A and Table 3B, may lead to a Golay pair when they are converted to sequences via $$gA_u(n) = \exp\left(\frac{j\varphi_{uA}(n)\pi}{4}\right) \text{ and } gB_u(n) = \exp\left(\frac{j\varphi_{uB}(n)\pi}{4}\right),$$

and each element of the sequences is a QPSK symbol. Additional phase shift may also be applied to the sequences. Based on the indicated sequence index u, the WTRU may obtain the sequences from Set A and Set B, for instance $gA_u \in \mathbb{C}^{L \times 1}$ and $gB_u \in \mathbb{C}^{L \times 1}$ where $gA_u \in \mathbb{C}^{Lp \times 1}$ and $gB_u$ may be a Golay complementary pair. Based on an indication, a set of zero symbols may be padded to $gA_u$ and $gB_u$, by zero-padding component 1906 resulting $pA_u \mathbb{C}^{Lp \times 1}$ and $pB_u \in$ respectively. The number of zero symbols may be a function of the bandwidth parts, subcarrier spacing, operation bandwidth, or the like and may determine the gap between the clusters in frequency. The WTRU may determine another two spreading sequences at spreading component 1908, for instance $sA \in \mathbb{C}^{Ls \times 1}$ and $sB \in \mathbb{C}^{Ls \times 1}$ for $gA_u$ and $gB_u$, respectively, and sA and sB may be a Golay complementary pair. L s may depend on the operating bandwidth, numerology, or the like.

TABLE 3A

Phase Indices $\varphi_{uA}$ (n) for Set A

| u | 0 | 1 | 2 | 3 | 4 | 5 | 6 | 7 | 8 | 9 | 10 | 11 |
|---|---|---|---|---|---|---|---|---|---|---|---|---|
| 0 | 1 | −3 | 3 | −1 | 1 | −3 | −3 | −3 | 1 | 1 | 1 | 1 |
| 1 | 1 | −3 | −1 | 3 | 1 | −3 | −3 | −3 | 1 | 1 | 1 | 1 |
| 2 | 1 | 1 | 1 | 1 | 3 | 1 | −3 | −1 | 1 | −3 | −3 | 1 |
| 3 | 1 | −3 | −3 | 1 | 3 | −3 | 1 | −1 | 1 | 1 | 1 | 1 |
| 4 | 1 | 1 | 1 | 1 | −1 | 1 | −3 | 3 | 1 | −3 | −3 | 1 |
| 5 | 1 | −3 | −3 | 1 | −1 | −3 | 1 | 3 | 1 | 1 | 1 | 1 |
| 6 | 1 | 1 | 1 | 1 | 3 | −3 | 1 | −1 | 1 | −3 | −3 | 1 |
| 7 | 1 | −3 | −3 | 1 | 3 | 1 | −3 | −1 | 1 | 1 | 1 | 1 |
| 8 | 1 | 1 | 1 | 1 | −1 | −3 | 1 | 3 | 1 | −3 | −3 | 1 |
| 9 | 1 | −3 | −3 | 1 | −1 | 1 | −3 | 3 | 1 | 1 | 1 | 1 |
| 10 | 1 | 1 | −3 | 1 | −3 | −1 | 1 | −1 | −3 | 1 | 1 | 1 |
| 11 | 1 | 1 | −3 | 1 | −3 | 3 | 1 | 3 | −3 | 1 | 1 | 1 |
| 12 | 1 | 1 | 1 | −3 | −3 | 3 | −3 | −1 | −3 | 1 | −3 | −3 |
| 13 | 1 | 1 | 1 | −3 | −3 | −1 | −3 | 3 | −3 | 1 | −3 | −3 |
| 14 | 1 | 1 | −3 | 1 | 1 | −1 | −3 | −1 | −3 | 1 | 1 | 1 |
| 15 | 1 | 1 | −3 | 1 | 1 | 3 | −3 | 3 | −3 | 1 | 1 | 1 |
| 16 | 1 | 1 | 1 | −3 | 1 | 3 | −3 | −1 | 1 | −3 | −3 | −3 |
| 17 | 1 | 1 | 1 | −3 | 1 | −1 | 1 | 3 | −3 | 1 | −3 | −3 |
| 18 | 1 | 1 | 1 | −3 | 3 | 3 | 1 | −3 | 1 | 1 | −3 | 1 |
| 19 | 1 | −3 | 1 | 1 | 1 | −3 | 1 | −1 | −1 | −3 | 1 | 1 |
| 20 | 1 | 1 | 1 | −3 | −1 | −1 | −3 | 1 | 1 | 1 | −3 | 1 |
| 21 | 1 | −3 | 1 | 1 | 1 | −3 | 3 | 3 | −3 | 1 | 1 | 1 |
| 22 | 1 | 1 | 1 | 3 | −3 | 1 | −3 | −3 | 3 | 1 | −3 | 1 |
| 23 | 1 | 1 | 1 | −1 | −3 | 1 | −3 | −3 | −1 | 1 | −3 | 1 |
| 24 | 1 | 1 | −3 | 1 | 1 | 1 | −1 | 3 | −3 | −3 | −3 | 1 |
| 25 | 1 | −3 | −3 | −3 | −1 | 3 | 1 | 1 | 1 | −3 | 1 | 1 |
| 26 | 1 | 1 | −3 | 1 | −3 | −3 | 3 | −1 | −3 | −3 | −3 | 1 |
| 27 | 1 | −3 | −3 | −3 | 3 | −1 | −3 | −3 | 1 | −3 | 1 | 1 |
| 28 | 1 | 1 | −3 | 1 | 3 | 1 | −3 | 3 | −3 | 1 | 1 | 1 |
| 29 | 1 | 1 | −3 | −3 | −1 | −3 | 1 | −1 | 1 | −3 | 1 | 1 |
| 30 | 1 | 1 | −3 | 1 | −1 | 1 | −3 | −1 | −3 | −3 | 1 | 1 |
| 31 | 1 | 1 | −3 | −3 | 3 | −3 | 1 | 3 | 1 | −3 | 1 | 1 |
| 32 | 1 | 1 | −3 | −3 | −3 | 1 | 1 | 3 | 1 | 1 | 3 | 1 |
| 33 | 1 | −1 | 1 | 1 | −1 | 1 | 1 | −3 | −3 | −3 | 1 | 1 |
| 34 | −3 | 3 | −3 | 1 | −1 | 1 | −3 | 1 | 1 | −3 | 1 | 1 |
| 35 | 1 | 1 | −3 | 1 | 1 | −3 | 1 | 3 | 1 | −3 | −1 | −3 |

TABLE 3B

Phase Indices $\varphi_{uB}(n)$ for Set B

Phase indices for Set B

| u | 0 | 1 | 2 | 3 | 4 | 5 | 6 | 7 | 8 | 9 | 10 | 11 |
|---|---|---|---|---|---|---|---|---|---|---|----|----|
| 0 | -3 | 1 | -3 | 1 | 1 | -3 | 1 | 1 | -1 | -1 | 1 | 1 |
| 1 | 1 | -3 | 1 | -3 | -3 | 1 | -3 | -3 | -1 | -1 | -3 | -3 |
| 2 | 1 | 1 | -3 | -3 | 3 | 1 | 1 | 3 | 1 | -3 | 1 | -3 |
| 3 | -3 | 1 | -3 | 1 | -1 | 1 | 1 | -1 | -3 | -3 | 1 | 1 |
| 4 | -3 | -3 | 1 | 1 | 3 | -3 | -3 | 3 | -3 | 1 | -3 | 1 |
| 5 | 1 | -3 | 1 | -3 | -1 | -3 | -3 | -1 | 1 | 1 | -3 | -3 |
| 6 | 1 | 1 | -3 | -3 | 3 | -3 | -3 | 3 | 1 | -3 | 1 | -3 |
| 7 | -3 | 1 | -3 | 1 | -1 | -3 | -3 | -1 | -3 | -3 | 1 | 1 |
| 8 | -3 | -3 | 1 | 1 | 3 | 1 | 1 | 3 | -3 | 1 | -3 | 1 |
| 9 | 1 | -3 | 1 | -3 | -1 | 1 | 1 | -1 | 1 | 1 | -3 | -3 |
| 10 | -3 | -3 | 1 | -3 | -1 | -3 | 3 | -3 | -3 | 1 | 1 | 1 |
| 11 | 1 | 1 | -3 | 1 | -1 | 1 | 3 | 1 | 1 | -3 | -3 | -3 |
| 12 | 1 | 1 | 1 | -3 | -1 | 1 | -1 | -3 | 1 | -3 | 1 | 1 |
| 13 | -3 | -3 | -3 | 1 | -1 | -3 | -1 | 1 | -3 | 1 | -3 | -3 |
| 14 | -3 | -3 | 1 | -3 | -1 | 1 | 3 | 1 | -3 | 1 | 1 | 1 |
| 15 | 1 | 1 | -3 | 1 | -1 | -3 | 3 | -3 | 1 | -3 | -3 | -3 |
| 16 | 1 | 1 | 1 | -3 | -1 | -3 | -1 | 1 | 1 | -3 | 1 | 1 |
| 17 | -3 | -3 | -3 | 1 | -1 | 1 | -1 | -3 | -3 | 1 | -3 | -3 |
| 18 | 1 | 1 | 1 | -3 | -3 | -3 | -1 | 3 | -3 | -3 | 1 | 1 |
| 19 | -3 | 1 | -3 | -3 | 1 | 3 | -3 | -3 | -3 | 1 | 1 | 1 |
| 20 | -3 | -3 | -3 | 1 | -3 | -3 | -1 | 3 | 1 | 1 | -3 | 1 |
| 21 | 1 | -3 | 1 | 1 | -1 | 3 | -3 | -3 | 1 | -3 | -3 | 1 |
| 22 | 1 | 1 | 1 | 3 | -3 | 1 | 1 | -1 | -3 | 1 | -3 | 1 |
| 23 | -3 | -3 | -3 | 3 | 1 | -3 | -3 | -3 | -1 | 1 | -3 | 1 |
| 24 | -3 | -3 | 1 | -3 | 3 | 3 | -3 | 1 | -3 | -3 | -3 | 1 |
| 25 | 1 | -3 | -3 | -3 | 1 | -3 | -1 | -1 | -3 | 1 | 1 | -3 |
| 26 | 1 | 1 | -3 | 1 | 3 | 3 | -3 | 1 | 1 | 1 | 1 | -3 |
| 27 | -3 | 1 | 1 | 1 | 1 | -3 | -1 | -1 | 1 | -3 | 1 | 1 |
| 28 | 1 | 1 | -3 | 1 | 3 | 1 | 1 | -1 | 1 | 1 | -3 | -3 |
| 29 | -3 | -3 | 1 | 1 | 3 | 1 | 1 | -1 | 1 | -3 | 1 | 1 |
| 30 | -3 | -3 | 1 | -3 | 3 | -3 | -3 | -1 | -3 | -3 | 1 | 1 |
| 31 | 1 | 1 | -3 | -3 | 3 | -3 | -3 | -1 | -3 | 1 | -3 | -3 |
| 32 | 1 | 1 | -3 | 1 | 1 | -3 | 1 | 3 | 1 | -3 | -1 | -3 |

TABLE 3B-continued

Phase Indices $\varphi_{uB}(n)$ for Set B

Phase indices for Set B

| u | 0 | 1 | 2 | 3 | 4 | 5 | 6 | 7 | 8 | 9 | 10 | 11 |
|---|---|---|---|---|---|---|---|---|---|---|----|----|
| 33 | -3 | 3 | -3 | 1 | -1 | 1 | -3 | 1 | 1 | -3 | 1 | 1 |
| 34 | -3 | 3 | -3 | -3 | 3 | -3 | -3 | 1 | 1 | 1 | -3 | -3 |
| 35 | -3 | -3 | 1 | 1 | 1 | -3 | -3 | -1 | -3 | -3 | -1 | -3 |

Exemplary values of sA and sB are given in Table 4. In Table 4, the values of A, B, or C may imply the parameters of a clustered structure or an interlace in the frequency domain. For example, the input of IDFT may be portioned into B clusters of size of A×12, and the cluster may be separated by C×12 tones in the frequency domain. In addition, in certain configurations sA and sB for 40 MHz configurations may be derived from sA and sB for 20 MHz configurations, by using one of the Golay construction methods in Property 1. For example, sA for 40 MHz may be based on sA and sB for 20 MHz and sB for 40 MHz may be based on sA and −sB for 20 MHz. In 1900, the padded sequences, for instance $pA_u$ and $pB_u$, may be spread with sA and sB as $sA \otimes pA_u \in \mathbb{C}^{M_b \times 1}$ and $sB \otimes pB_u \in \mathbb{C}^{M_b \times 1}$ To increase multiplexing capacity, spread sequences may also be multiplied with unit-norm complex coefficients, for instance $w_0$ and $w_1$, and the resulting sequences may be mapped to the input of IDFT transformation component 1910. To signal control information, ACK, NACK, SR, RS(s), or the like the output of IDFT may be circularly shifted by cyclic shift component 1912. After cyclic prefix addition by CP+ component 1914, the generated signal may be transmitted.

TABLE 4

| Subcarrier spacing (kHz) | Signal Bandwidth: 20 MHz ||||| Signal Bandwidth: 40 MHz ||||| Signal Bandwidth: 80 MHz |||||
|---|---|---|---|---|---|---|---|---|---|---|---|---|---|---|---|
| | A | B | C | sA | sB | A | B | C | sA | sB | A | B | C | sA | sB |
| 15 | 1 | 10 | 9 | [1 1 1 -1i 1i] | [1 1i -1 1 -1i] | 1 | 20 | 9 | [1 1 1 1 1 -1 1 -1 -1 1] | [1 1 -1 -1 1 1 1 -1 1 -1] | 1 | 40 | 9 | [1 1 1 1 1 -1 1 -1 -1 1 1 1 -1 -1 1 1 1 -1 -1 1] | [1 1 1 1 1 -1 1 -1 -1 1 -1 1 -1 1 1 -1 -1 -1 1 -1 1] |
| 30 | 1 | 10 | 4 | [1 1 1 -1i 1i] | [1 1i -1 1 -1i] | 1 | 20 | 4 | [1 1 1 1 1 -1 1 -1 -1 1] | [1 1 -1 -1 1 1 1 -1 1 -1] | 1 | 40 | 4 | [1 1 1 1 1 -1 1 -1 -1 1 1 1 -1 -1 1 1 1 -1 -1 1] | [1 1 1 1 1 -1 1 -1 -1 1 -1 1 -1 1 1 -1 -1 -1 1 -1 1] |
| 60 | 1 | 6 | 3 | [1 1i 1 1i -1 1] | [1 1 -1 1 -1] | 1 | 12 | 3 | [1 1 1 1i -1 1] | [1 1 -1i -1 1 -1] | 1 | 24 | 3 | [1 1 1 1i -1 1 1 -1i -1 1 -1] | [1 1 1 1i -1 -1 -1 1i 1 1 1] |
| 120 | 1 | 6 | 1 | [1 1i 1 1i -1 1] | [1 1 -1 1 -1] | 1 | 12 | 1 | [1 1 1 1i -1 1] | [1 1 -1i -1 1 -1] | 1 | 24 | 1 | [1 1 1 1i -1 1 1 -1i -1 1 -1] | [1 1 1 1i -1 -1 -1 1i 1 1 1] |

Coherent detection may be configured such that the quinary Golay-based sequence has two interleaved sub-quinary Golay-based sequences. For this configuration, a reference sequence and modulated sequence with a QPSK symbol may be derived by obtaining a Golay pair (c, d) of length $N_{rb}/2$. Also in this configuration, c'=upsample{c, 2} and d'=circshift(upsample{d, 2} may be allocated and c', d' padded with $(k-1)N_{rb}$ null symbols to be designated as c", d". Furthermore, a Golay pair (a, b) of length $N_{cluster}$ may be obtained and a quinary Golay pair obtained with:

$$X_e(Z)=w_1x_a(z^{k'})x_{c''}(z^\ell)+w_2x_b(z^{k'})x_{d''}(z^\ell)z^m \quad \text{Eq. (24)}$$

$$x_f(z)=w_1x_{\bar{b}*}(z^{k'})x_{c''}(z^\ell)-w_2x_{\bar{a}*}(z^{k'})x_{d''}(z^\ell)z^m \quad \text{Eq. (25)}$$

where $k'=kN_{rb}$, $\ell=1$, m=0, $w_1$, and $w_2$ are unit norm scalars. In addition, $$e=w_1a\otimes c''+w_2b\otimes d'', \quad \text{Eq. (26)}$$

and $$f=w_1\bar{b}*\otimes c''-w_2a*\otimes d'', \quad \text{Eq. (27)}$$

where the interlace may use either e or for a combination in frequency.

In certain configurations, $w_1$ or $w_2$ may be a QPSK symbol that carries a SR, ACK, NACK, SR, RS, or the like information. In a different configuration, $w_1$ or $w_2$ may be a fixed symbol utilized for coherent detection at a receiver, transceiver, or the like. In certain configurations, users may be separated by applying a cyclic shift to the output of an ID FT.

Figure 6:
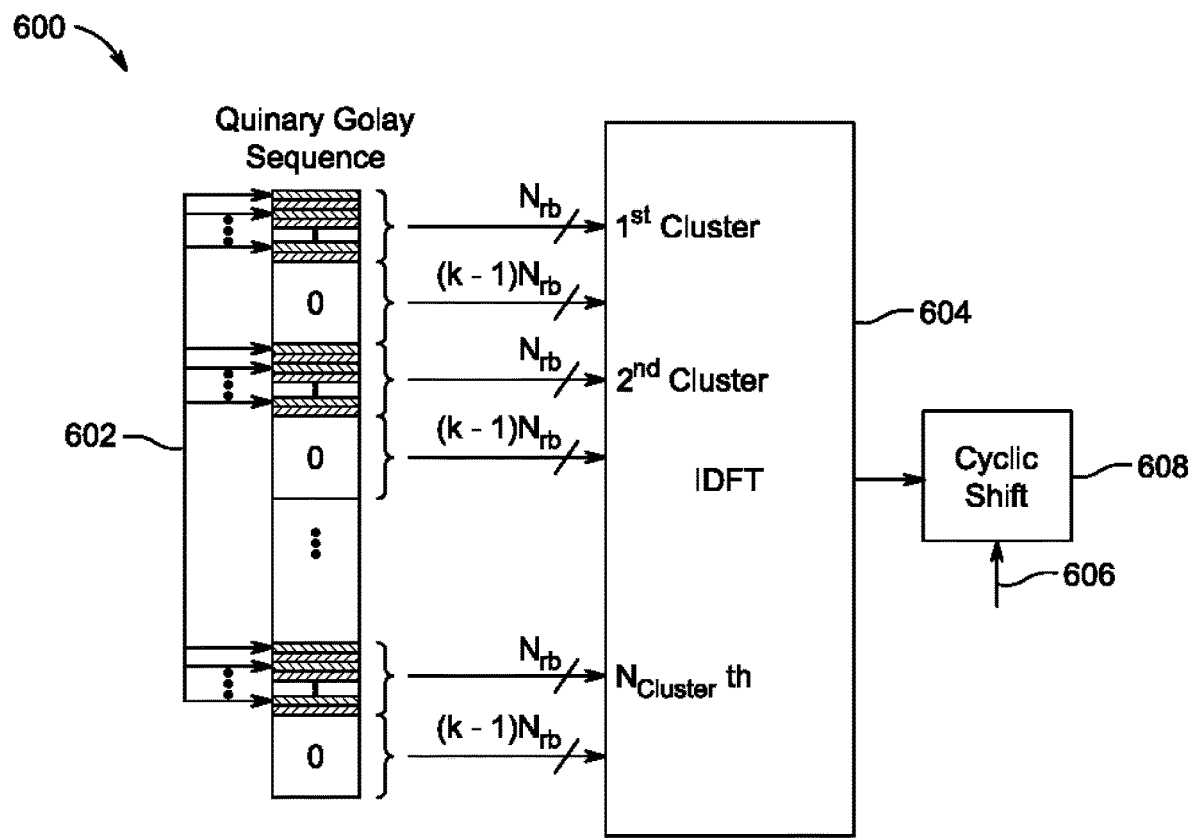
FIG. 6 is a transmitter or a transceiver block diagram for interlace based on a quinary Golay-based sequence.

FIG. 6 is a transmitter or a transceiver block diagram 600 for interlace based on a quinary Golay-based sequence. Input 602 may be an ACK, NACK, SR, RS, or the like utilized to generate a quinary Golay-based sequence. An IDFT operation 604 may be performed on the $1^{st}$ cluster to $N_{cluster}^{th}$ of the sequence(s) with the output shifted by cyclic shift unit 608 using information, such as a WTRU index, 606. Since $w_1$ or $w_2$ may be a QPSK symbol or fixed symbol, 600 may be a configuration to multiplex reference symbols and data symbols such that every other symbol in frequency may be fixed and function as pilots.

Figure 7:
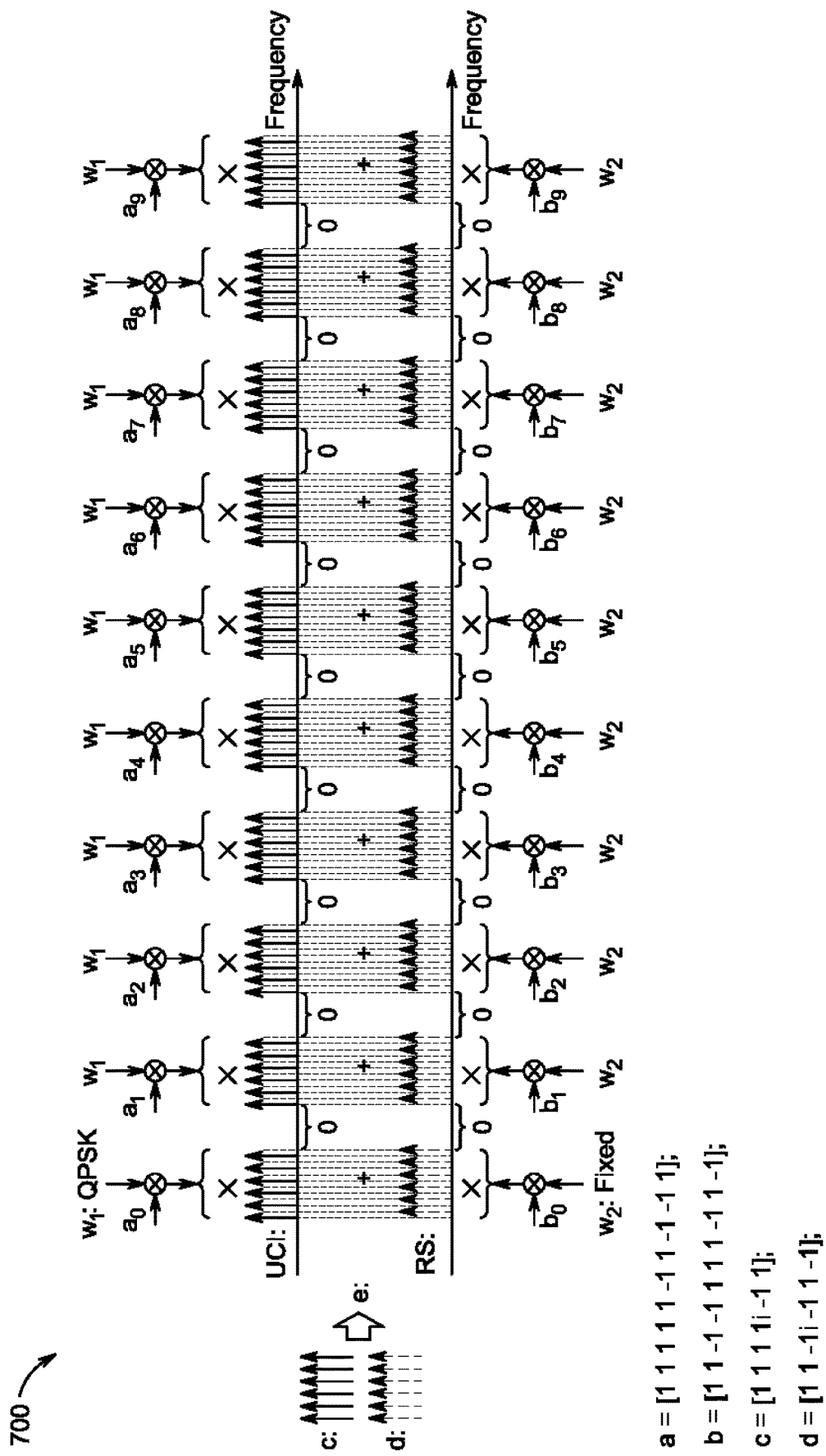
FIG. 7 is a diagram showing another example of sPUCCH interlace.

FIG. 7 is a diagram 700 showing another example of sPUCCH interlace. In diagram 700, $w_1$ may be a QPSK symbol and $w_2$ a reference signal or symbol. For the structure of e, when $N_{RB}=12$, $N_{cluster}=10$, and k=10, sequences a, b, c, and d may be obtained such that:
a=[1 1 1 1 1 −1 1 −1 −1 1]; b=[1 1 −1 −1 1 1 1 −1 1 −1];
c=[1 1 1 1 i −1 1]; and d=[1 1 −1 i −1 1 −1]. In diagram 700, although interleaved subcarriers are multiplied with a QPSK symbol, PAPR may be substantially low as the sequence may be one of the sequences in a quinary Golay pair.

Two or more OFDM symbols may be generated with coherent detection and $w_1$ or $w_2$ for the corresponding OFDM symbols may be a reference symbol such as a QPSK symbol. An additional phase shift may be applied to interlaces to achieve different QPSK constellations. In addition, multiple interlace assignments for sPUCCH may be configured. A BS may assign multiple interlaces to WTRUs and this may be indicated through configuration, such as radio resource control (RRC) messaging. The interlaces may be generated through corresponding Golay complementary pairs, such as sequence e and f, to maintain low PAPR. While one interlace may indicate first information, such as control information, ACK, NACK, SR, or the like, the other interlace may indicate second information.

Figures 8, 9:
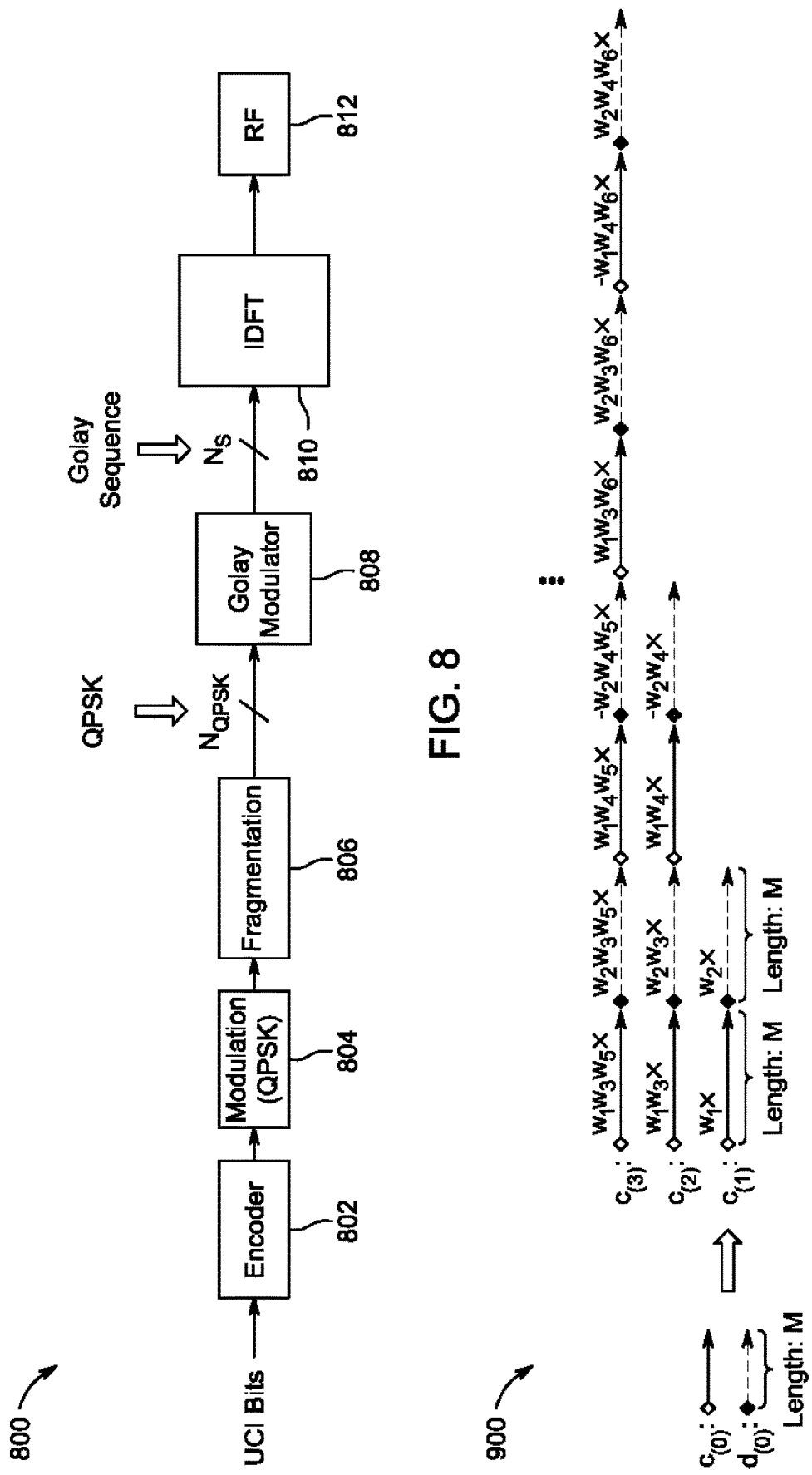
FIG. 8 is a transmitter or transceiver block diagram with a Golay modulator (GM) for quadrature phase shift keying (QPSK)
FIG. 9 is a diagram of the sequence $c(n-F1)$ structure in GM1 for $n=1, 2, 3$.

FIG. 8 is a transmitter or a transceiver block diagram 800 with a Golay modulator (GM) for quadrature phase shift keying (QPSK). Golay-sequence based interlaces for sPUCCH with more than 2 bits may be configured. UCI bits may be inputted to an encoder 802 and modulated at modulation component 804. A set of QPSK symbols, which may be a fragment of coded and QPSK modulated sequences after processing by fragmentation component 806, may be processed by GM 808 before IDFT operation by IDFT component 810. A GM may be a component taking an input of modulation symbols, such as $N_{QPSK}$ QPSK symbols, and output one of many sequences, such as a sequence of length $N_s$, in a Golay complementary pair. Output of IDFT component 810 may be processed by radio frequency (RF) component 812.

As an example, in a GM1, concatenation and Property 1 may be configured, by setting a, b=[1]. Correspondingly, a recursive method to generate Golay pair ($c_{(n+1)}$, $d_{(n+1)}$) of length of $M2^n$ at nth iteration may be developed as $$x_{c_{(n+1)}}(z) = w_{2n+1}x_{c_{(n)}}(z) + w_{2n+2}x_{d_{(n)}}(z)z^{M2^n} \quad \text{Eq. (28)}$$

$$x_{d_{(n+1)}}(z) = w_{2n+1}x_{c_{(n)}}(z) - w_{2n+2}x_{d_{(n)}}(z)z^{M2^n}, \quad \text{Eq. (29)}$$

where M is the length of $c_{(0)}$ and $d_{(0)}$ and $|w_i|^2=1$. This may imply that $$C_{(n+1)}=W_{2n+1}C_{(n)}|W_{2n+2}d_{(n)} \quad \text{Eq. (30)}$$

$$d_{(n+1)}=W_{2n+1}C_{(n)}|W_{2n+2}d_{(n)}, \quad \text{Eq. (31)}$$

where x|y denotes the concatenation of the sequence x and the sequence y.

FIG. 9 is a diagram 900 of the sequence c (i) structure in GM1 for n=1, 2, 3. In FIG. 9, the structure of the sequence $c_{(n+1)}$ in GM1 and corresponding coefficients at n th iteration are shown. Arrows may represent subsequences $c_{(0)}$ and $d_{(0)}$. For the nth iteration, the coefficient that multiplies $c_{(0)}$ or $d_{(0)}$ may be a function of n variables. For example, for $c_{(3)}$, the coefficient for the first subsequence may be $w_1w_3w_5$, or a factor of three variables, and it multiplies $c_{(0)}$. The coefficient for the fourth subsequence may be $-w_1w_4w_5$, or a factor of three variables and it multiplies $d_{(0)}$. Coefficients at the nth iteration may have unit amplitude as $|w_i|^2=1$.

In certain configurations, GM may be a component that sets coefficients of the subsequences of $c_{(n+1)}$ (i.e., $c_{(0)}$ and $d_{(0)}$) based on procedures given herein to QPSK symbols and related parity or redundant symbols derived based on the QPSK symbols to return $c_{(n+1)}$ as the output of GM.

Figure 10A:
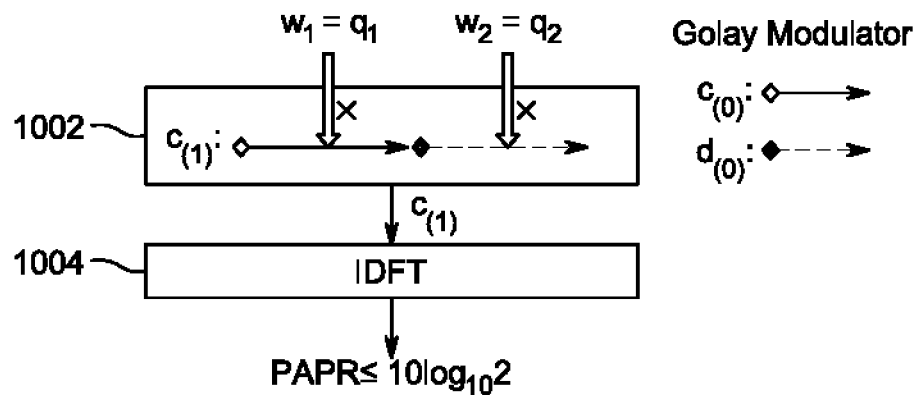
FIG. 10A is a transmitter or transceiver block diagram for utilizing 2 QPSK symbol ($n=1$)
Figure 10B:
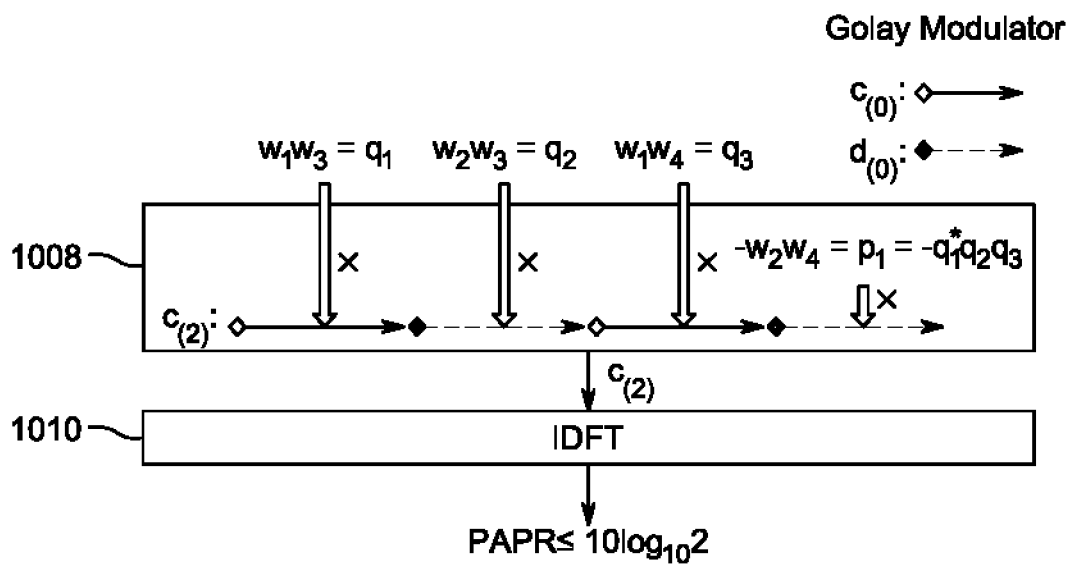
FIG. 10B is a transmitter or transceiver block diagram for utilizing 3 QPSK symbols ($n=2$)
Figure 10C:
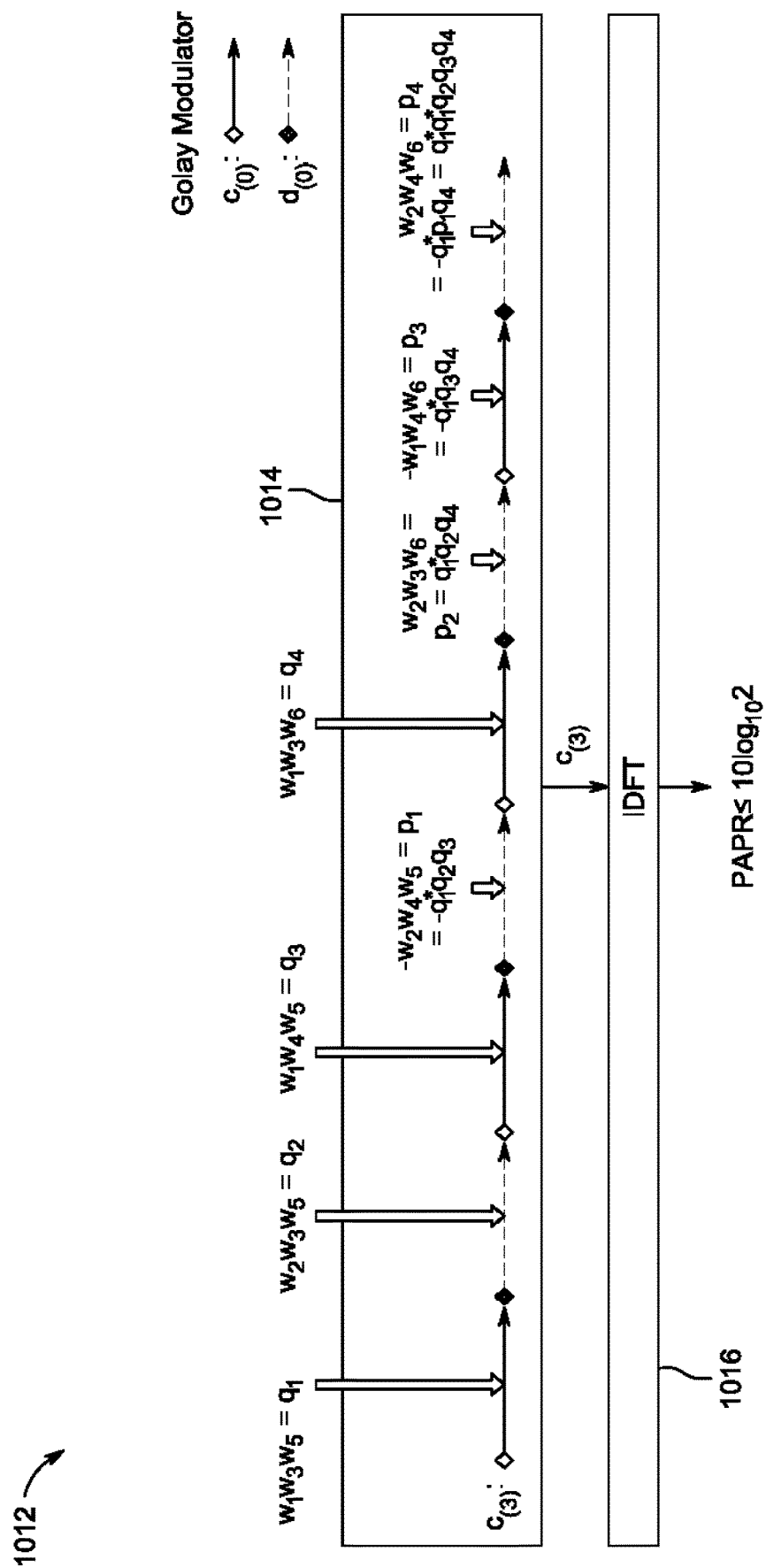
FIG. 10C is a transmitter or transceiver block diagram for utilizing 4 QPSK symbols ($n=3$)

FIG. 10A is a transmitter or transceiver block diagram 1000 for utilizing 2 QPSK symbols (n=1) by GM 1002 and IDFT 1004. FIG. 10B is a transmitter or transceiver block diagram 1006 for utilizing 3 QPSK symbols (n=2) by GM 1008 and IDFT 1010. FIG. 10C is a transmitter or transceiver block diagram 1012 for utilizing 4 QPSK symbols (n=3) by GM 1014 and IDFT 1016. In FIGS. 10A-10C, GM1 for n=1,2, 3 may be configured. In these block diagrams, $q_i$ may be the ith QPSK symbol and $p_i$ the ith parity symbol. For n=1, $w_1$ and $w_2$ may be set to $q_1$ and $q_2$, respectively. This configuration may not require parity symbols as $w_1$ and $w_2$ may be chosen independently. For n=2, GM1 may be capable of utilizing 3 QPSK symbols, and $w_1w_3$, $w_2w_3$, and $w_1w_4$ may be set to $q_1$, $q_2$, and $q_3$, respectively. The corresponding parity symbol may be determined as $p_1=-q^*_1q_2q_3$. For n=3, GM1 may utilize 4 QPSK symbols, and $w_1w_3w_5$, $w_2w_3w_5$, $w_1w_4w_5$, and $w_1w_3w_6$ may be set to $q_1$, $q_2$, $q_3$, and $q_4$, respectively. Corresponding parity symbols may be calculated as $p_1=-q^*_1q_2q_3$, $p_2=q^*_1q_2q_3$, $p_3=-q^*_1q_2q_4$, and $p_4=-q^*_1q_1q_4=q^*_1q^*_1q_2q_3q_4$.

In certain configurations, parity symbols and QPSK symbols may be different. For example, $w_2w_3w_6$ may be set to $q_4$ instead of $w_1w_3w_6$ for n=3 and corresponding parity symbols may be derived correspondingly. In certain configurations, (n+1) QPSK symbols may be supported for GM1 with the output of $c_{(n)}$. Some of the QPSK symbols may be fixed to reduce complexity or to serve as reference symbols in frequency for channel estimation at a receiver.

A numerical example for GM1 for n=3 is given as below:

| Step 1. | c = [1 1 1 −i i].'; d = [1 i −1 1 −i].'; | % (c in Golay pair); % (d in Golay pair) % Length of Golay sequence |
|---|---|---|
| Step 2. | M = numel(c); | |
| Step 3. | q = exp(1i*randn(4)); | % Random QPSK symbols |
| Step 4. | p1 = −conj(q(1))*q(2)*q(3); | % Parity |
| Step 5. | p2 = conj(q(1))*q(2)*q(4); | % Parity |
| Step 6. | p3 = −conj(q(1))*q(3)*q(4); | % Parity |
| Step 7. | p4 = conj(q(1))*conj(q(1))* q(2)*q(3)*q(4); | % Parity |
| Step 8. | m = [q(1) q(2) q(3) p1 q(4) p2 p3 p4].'; | % Multiply the sequences and the symbols, C_(3) |
| Step 9. | s = kron(m, ones(M, 1)) .* kron(ones(4, 1),[c; d]); | % Transmitted signal, the IDFT size is 4096. |
| Step 10. | t = ifft(s(:), 4096); | |

For GM1, any one of steps 1-10 may be skipped or additional steps performed, as desired.

A Golay modulator may also be realized by using a channel code, such as Reed-Muller, Walsh, or the like, and constraining the channel code such that it includes the N−1 monomials with the order of 2 where N may be the total number of monomial with the order of 2. For example, the generator matrix G for a Reed-Muller code of length of 8 with the order of 2 for the alphabet of $\mathbb{Z}_4$ (i.e., [0 1 2 3], where each element represents the QPSK symbols of [1, j, −1, −j], respectively) may be:

$$G = \begin{bmatrix} 1 & 1 & 1 & 1 & 1 & 1 & 1 & 1 \\ 0 & 1 & 0 & 1 & 0 & 1 & 0 & 1 \\ 0 & 0 & 1 & 1 & 0 & 0 & 1 & 1 \\ 0 & 0 & 0 & 0 & 1 & 1 & 1 & 1 \\ 0 & 0 & 0 & 1 & 0 & 0 & 0 & 1 \\ 0 & 0 & 0 & 0 & 0 & 1 & 0 & 1 \\ 0 & 0 & 0 & 0 & 0 & 0 & 1 & 1 \end{bmatrix} \quad \text{Eq. (32)}$$

In the above matrix, the last three rows may correspond to monomials with the order of 2, such as $x_1 \times 2$, $x_2 \times 3$, and $x_1 \times 3$, i.e., (N=3). If the message is $b=[m_1\ m_2\ m_3\ m_4\ 0\ 2\ 2]$ where $m_1 \in \mathbb{Z}_4$, the operation, e=mod(bG, 4) may lead to be mapped to QPSK symbols. After mapping to the QPSK symbols, such as f, the vector f may lead to vector $[q_1\ q_2\ q_3\ p_1\ q_4\ P_2\ P_3\ P_4]$ in FIG. 10.

Figure 17:
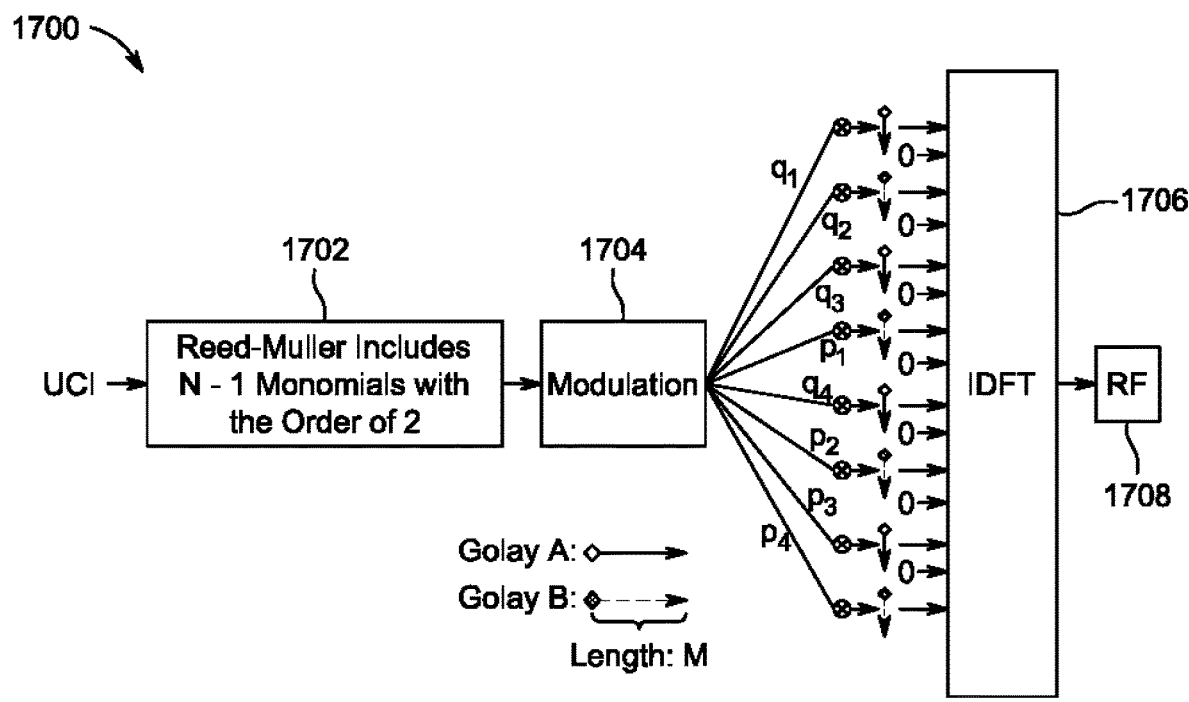
FIG. 17 is a diagram of a Golay modulator using Reed-Muller.

FIG. 17 is a diagram of a Golay modulator using Reed-Muller 1700 where UCI information is processed by Reed-Muller component 1702, modulated by modulation component 1704, IDFT operated by IDFT component 1706, and processed by RF component 1708. Each element of $[q_1\ q_2\ q_3\ P_1\ q_4\ P_2\ P_3\ P_4]$ may modulate the Golay sequence, i.e. Golay A and Golay B, as in FIG. 17. In certain configurations, zeros may be added between modulated Golay A and Golay B sequences to generate interlaces.

An error correction encoder may utilize a polar code where frozen bits or messages may be chosen such that the resulting codeword yields a low PAPR signal or waveform. For example, a generator matrix may be given by $G_8 = G_2^{\otimes 3}$ where $$G_2 = \begin{bmatrix} 1 & 0 \\ 1 & 1 \end{bmatrix}$$

for a polar code is given. In a polar coding configuration, rows 1-5 may be frozen by multiplying with zeros. In accordance with another configuration, 2nd and 3rd rows may be multiplied by 2 for QPSK or 1 for BPSK. This may be similar to the operation in Reed-Muller in FIG. 17. Hence, by only changing the frozen bits, PAPR may be reduced. A message, such as vector b, may be encoded as e=mod(bG, 4) leading to values to be mapped to QPSK symbols. Each element of $e=[q_1\ q_2\ q_3\ P_1\ q_4\ P_2\ P_3\ P_4]$ may modulate a Golay sequence, i.e. Golay A and Golay B, as in FIG. 17. Similar to above, in a configuration, zeros may be added between modulated Golay A and Golay B sequences to generate interlaces.

FIG. 18 is an example of a table for generating QPSK symbols for a Golay modulator with a polar encoder 1800. For a GM2 a recursive method may be utilized to generate Golay pair $(c_{(n+1)}, d_{(n+1)})$ of length of $2N(M+N_z)2^n$ at an nth iteration as follows:

Step 1: Let a and b be Golay pairs of length N and c and d be Golay pairs of length M;
Step 2: Pad c and d with N, zero symbols and assign them to c' and d';
Step 3: Calculate $c_{(1)}$ and $d_{(1)}$ as $$x_{c_{(1)}}(z) = w_1\underbrace{x_a(z^k)x_{c'}(z^l)}_{s_{11}} + w_2\underbrace{x_b(z^k)x_{d'}(z^l)z^{N(M+N_z)}}_{s_{12}} \quad \text{Eq. (33)}$$

$$x_{d_{(1)}}(z) = w_1\underbrace{x_{\bar{b}^*}(z^k)x_{c'}(z^l)}_{s_{21}} - w_2\underbrace{x_{\bar{a}^*}(z^k)x_{d'}(z^l)z^{N(M+N_z)}}_{s_{22}} \quad \text{Eq. (34)}$$

where $|w_1|^2=1$ and $|w_2|^2=1$. Correspondingly, $$c_{(1)} = w_1\underbrace{a \otimes c'}_{s_{11}} \Big| \underbrace{w_2 b \otimes d'}_{s_{12}}, \quad \text{Eq. (35)}$$

and $$d_{(1)} = w_1\underbrace{\bar{b}^* \otimes c'}_{s_{21}} \Big| \underbrace{-w_2 \bar{a}^* \otimes d'}_{s_{22}}; \quad \text{Eq. (36)}$$

Step 4: Generate Golay pair $(c_{(n+1)}, d_{(n+1)})$ of length of $2N(M+N_z)2^n$ at the nth iteration as $$x_{c_{(n+i)}}(z)=w_{2n+1}x_{c_{(n)}}(z)+w_{2n+2}x_{d_{(n)}}(z)z^\beta \quad \text{Eq. (37)}$$

$$x_{d_{(n+i)}}(Z)=W_{2n+1}X_{c_{(n)}}(Z)-W_{2n+2}X_{d_{(n)}}(z)z^\beta \quad \text{Eq. (38)}$$

where $n \geq 1, \beta=M2^{n-1}$, and $|w_i|^2=1$. This formula *may* imply that:

$$C_{(n+1)}=W_{2n+1}C_{(n)}+W_{2n+2}\text{circshift}(d_{(n)},\beta) \quad \text{Eq. (39)}$$

$$C_{(n+1)}=W_{2n+1}C_{(n)}-W_{2n+2}\text{circshift}(d_{(n)},\beta), \quad \text{Eq. (40)}$$

where the sequence c (n) and shifted version of the sequence d (n) are overlapped to generate the sequence $C_{(n+1)}$ and $d_{(n+1)}$.

Figure 11:
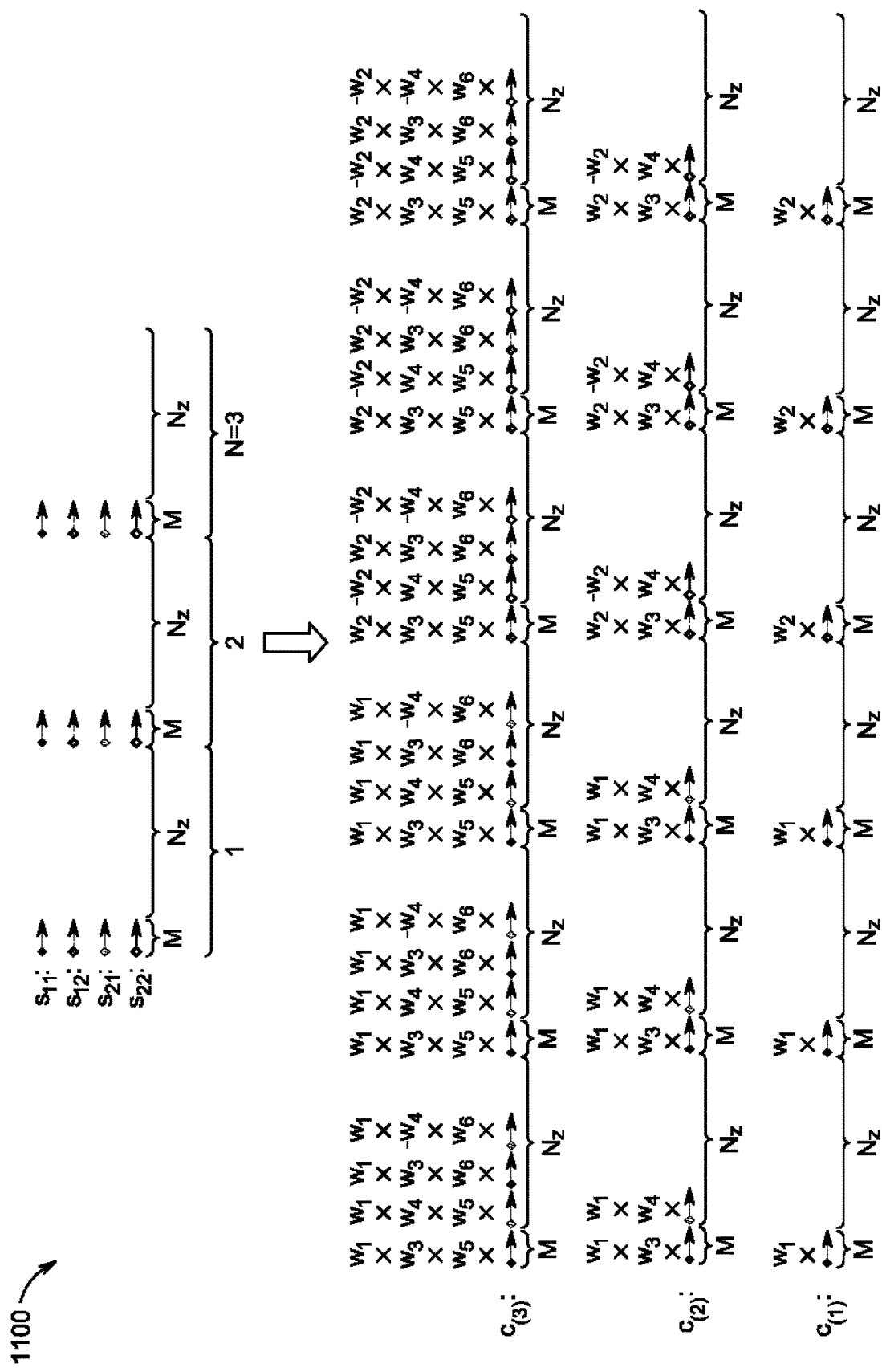
FIG. 11 is a diagram of the sequence $c(n-F1)$ structure in GM2 for $n=1, 2, 3$ when $N=3$.

FIG. 11 is a diagram 1100 of the sequence $c_{(n+1)}$ structure in GM2 for n=1, 2, 3 when N=3. The group of arrows marked may represent $s_{11}=a \otimes c'$, $s_{12}=b \otimes d'$, $s_{21}=\bar{b}^* \otimes c'$, and $s_{22}=\bar{a}^* \otimes d'$, respectively. A GM may be a component that sets the coefficients of the subsequences of $c_{(n+1)}$ (i.e., $s_{11}$, $s_{12}$, $s_{21}$, and $s_{22}$) based on procedures given herein to QPSK symbols and related parity or redundant symbols derived based on the QPSK symbols to return $c_{(n+1)}$ as the output of a GM operation.

Figure 12A:
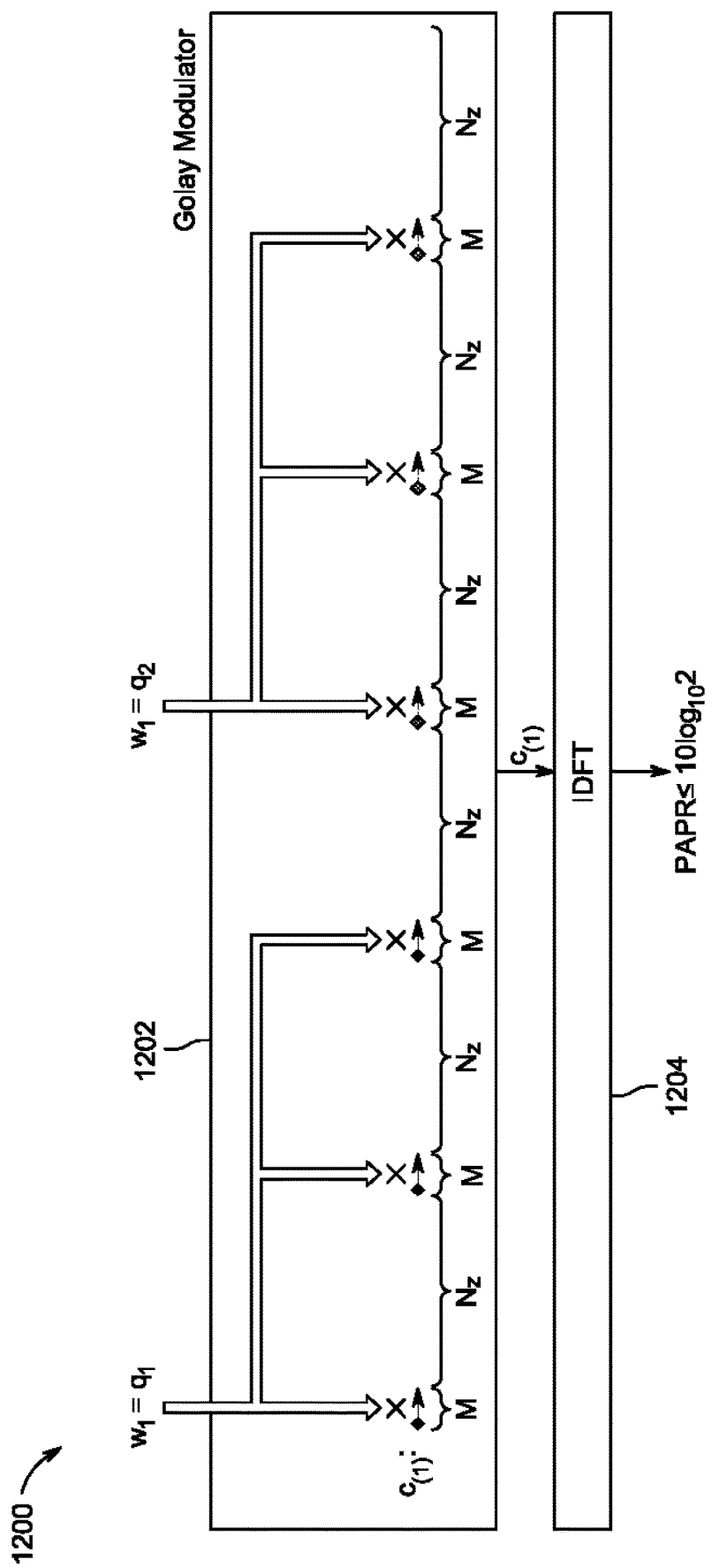
FIG. 12A is a transmitter or transceiver block diagram for utilizing 2 QPSK symbols ($n=1$)
Figure 12B:
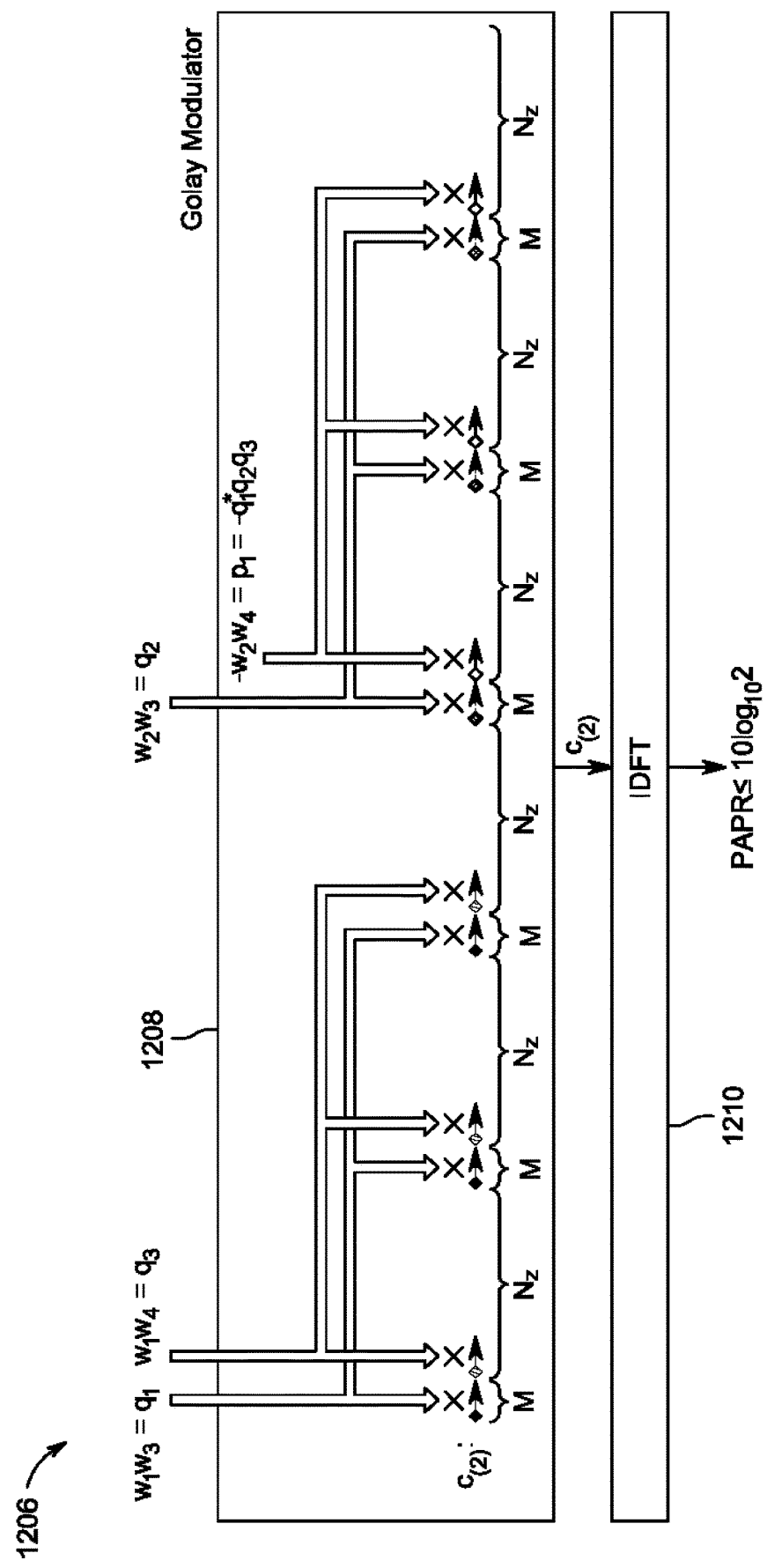
FIG. 12B is a transmitter or transceiver block diagram for utilizing 3 QPSK symbols ($n=2$)
Figure 12C:
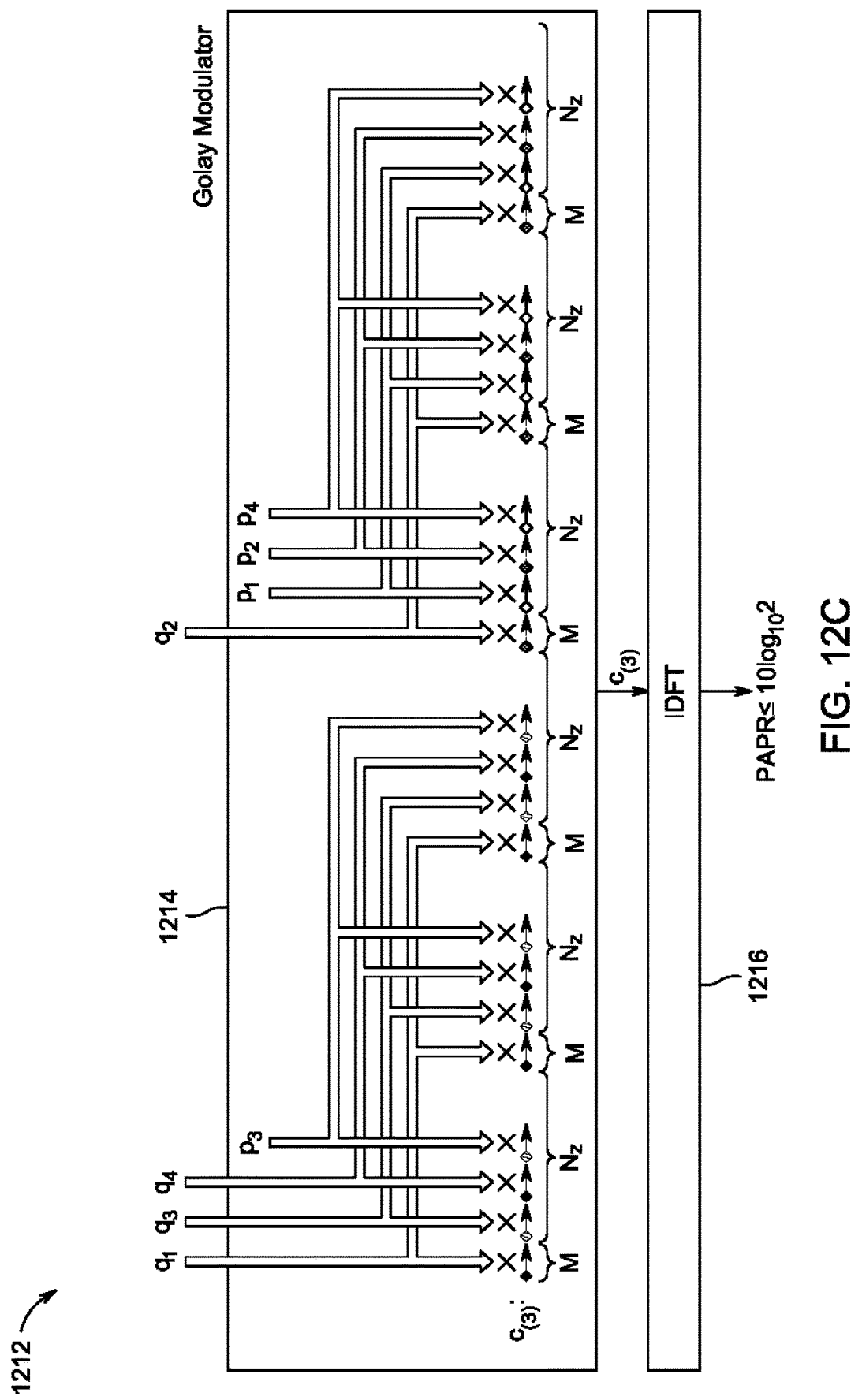
FIG. 12C is a transmitter or transceiver block diagram for utilizing 4 QPSK symbols ($n=3$, $p_1=-q^*_1 q_2 q_3$, $p_2=q^*_1 q_2 q_4$, $p_3=-q^*_1 q_3 q_4$, and $p_4=-q_1 q_1 q_4=q_1 q_1 q_2 q_3 q_4$)

FIG. 12a is a transmitter or transceiver block diagram 1200 for utilizing 2 QPSK symbols (n=1) by GM 1202 and IDFT 1204. FIG. 12b is a transmitter or transceiver block diagram 1206 for utilizing 3 QPSK symbols (n=2) by GM 1208 and IDFT 1210. FIG. 12c is a transmitter or transceiver block diagram 1212 for utilizing 4 QPSK symbols (n=3, $p_1=-q^*_1q_2q_3$, $p_2=q^*_1q_2q_4$, $p_3=-q^*_1q_3q_4$, and $p_4=-q^*_1q_1q_4=q^*_1q^*_1q_2q_3q_4$) by GM 1214 and IDFT 1216. In FIGS. 12a, 12b, and 12c, examples with GM1 for n=1, 2, 3 are given based on the example provided in FIG. 11. In these block diagrams, $q_i$ may be the ith QPSK symbol and $p_i$ is the ith parity symbol. For n=1, $w_1$ and $w_2$ may be set to $q_1$ and $q_2$, respectively. Without parity symbols, $w_1$ and $w_2$ may be chosen independently. For n=2, GM1 may support 3 QPSK symbols, where $w_1w_3$, $w_2w_3$, and $w_1w_4$ may be set to $q_1$, $q_2$, and $q_3$, respectively. A corresponding parity symbol may be calculated as $p_1=-q^*_1q_2q_3$. For n=3, GM1 may support 4 QPSK symbols, where $w_1w_3w_5$, $w_2w_3w_5$, $w_1w_4w_5$, and $w_1w_3w_6$ may be set to $q_1$, $q_2$, $q_3$, and $q_4$, respectively. Corresponding parity symbols may be calculated as $p_1=-q^*_1q_2q_3$, $p_2=q^*_1q_2q_4$, $p_3=-q^*_1q_3q_4$, and $p_4=-q^*_1q_1q_4=q^*_1q^*_1q_2q_3q_4$.

The order of the parity symbols and QPSK symbols may be different than the examples in FIG. 12a, 12b, or 12c. For example, $w_2w_3w_6$ may be set to $q_4$ instead of $w_1w_3w_6$ for the case of n=3 and parity symbols may be derived correspondingly. In certain configurations, (n+1) QPSK symbols may be supported for GM2 with the output of $c_{(n)}$. Some QPSK symbols may be fixed to reduce complexity or serve as reference symbols in frequency for channel estimation at a receiver or transceiver.

A procedure that generates an interlace for sPUCCH ($N_{RB}$=12, $N_{cluster}$=10, k=10, N z=117, M=3, N=5, (=3×2 n)) based on GM2 may be as follows:

Step 1. a=[1 1 1 −i i].'; b=[1 i −1 1 −i].';
Step 2. c=[1 1i 1 zeros(1,117)].'; d=[1 1 −1 zeros(1,117)].'; % Nz=117
Step 3. $s_{11}$=kron(a,c);
Step 4. $s_{12}$=kron(b,d);
Step 5. $s_{21}$=kron(conj(flipud(b)),c);
Step 6. $s_{22}$=kron(conj(flipud(a)),d);
Step 7. q=exp(1i*randn(4,1)); % QPSK symbols
Step 8. $p_1$=−conj(q(1))*q(2)*q(3);
Step 9. $p_2$=conj(q(1))*q(2)*q(4);
Step 10. $p_3$=−conj(q(1))*q(3)*q(4);
Step 11. $p_4$=conj(q(1))*conj(q(1))*q(2)*q(3)*q(4);
Step 12. sq1=s11*q(1);
Step 13. sq3=circshift(s21*q(3),3);
Step 14. sq4=circshift(s11*q(4),6);
Step 15. sp3=circshift(s21*p3,9);
Step 16. sq2=s12*q(2);
Step 17. sp1=circshift(s22*p1,3);
Step 18. sp2=circshift(s12*p2,6);
Step 19. sp4=circshift(s22*p4,9);
Step 20. s=[sq1+sq3+sq4+sp3; sq2+sp1+sp2+sp4];% C_(3)
Step 21. t=ifft(s(:),4096); % IDFT size is 4096, transmitted signal For GM2, any one of steps 1-21 may be skipped or additional steps performed, as desired.

Sequence c and d may be up-sampled by u before the procedure to generate the Golay pair ($c_{(n+1)}$, $d_{(n+1)}$) with GM2 and the new β may be set to B/u. This may result in interleaved QPSK and parity symbols in frequency. By choosing $q_1$ and $q_3$ to be fixed symbols, it may be possible generate reference symbols for each cluster in interlace, e.g., 3 RS for a single RB, PRB, or the like. To generate one interlace for sPUCCH with $N_{RB}$=12, $N_{cluster}$=10, k=10, $N_z$=117, M=3, N=5, and β=$2^n$, based on GM2 the following may be performed:

Step 1. a=[1 1 1 −i i].'; b=[1 i −1 1 −i].';
Step 2. c=[upsample([1 1i 1], 4) zeros(1,111)].'; d=[upsample([1 1 −1], 4) zeros(1,111)].';
Step 3. s11=kron(a,c);
Step 4. s12=kron(b,d);
Step 5. s21=kron(conj(flipud(b)),c);
Step 6. s22=kron(conj(flipud(a)),d);
Step 7. q=exp(1i*randn(4,1)); % QPSK symbols
Step 8. $p_1$=−conj(q(1))*q(2)*q(3);
Step 9. $p_2$=conj(q(1))*q(2)*q(4);
Step 10. $p_3$=−conj(q(1))*q(3)*q(4);
Step 11. $p_4$=conj(q(1))*conj(q(1))*q(2)*q(3)*q(4);
Step 12. sq1=s11*q(1);
Step 13. sq3=circshift(s21*q(3),1);
Step 14. sq4=circshift(s11*q(4),2);
Step 15. sp3=circshift(s21*p3,3);
Step 16. sq2=s12*q(2);
Step 17. sp1=circshift(s22*p1,1);
Step 18. sp2=circshift(s12*p2,2);
Step 19. sp4=circshift(s22*p4,3);
Step 20. s=[sq1+sq3+sq4+sp3; sq2+sp1+sp2+sp4];
Step 21. t=ifft(s(:),4096*4); % IDFT size is 4096, transmitted signal In this case for GM2, any one of steps 1-21 may be skipped or additional steps performed, as desired.

Figure 13:
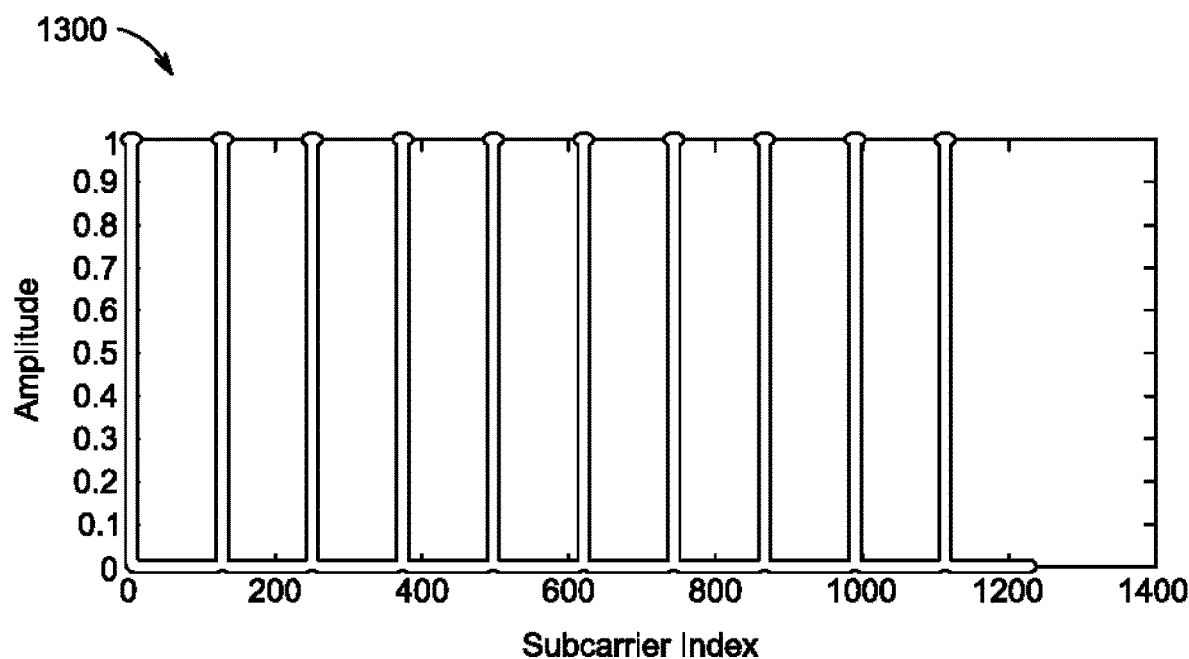
FIG. 13 is a chart of a generated interlace by using GM2.

FIG. 13 is a chart 1300 of a generated interlace by using GM2. As the origination sequences are QPSK-based Golay pairs and the GM2 settings do not overlap the QPSK symbols, the amplitude for each subcarrier in the interlace may be 1 in this configuration. Since GM2 may result in a quinary Golay sequence, in certain configurations the PAPR of the transmitted signal or waveform may be less than or equal to ~3 dB or $10 \log_{10} 2$. In addition, QPSK symbols for GM2 may be fixed to generate a full RS for one interlace in a sPUCCH. As GM1 and GM2 include coding with parity symbols, in certain configurations UCI may transmitted without further coding.

A sequence carrying control information may be mapped to a set of interleaved subcarriers. A length-K sequence may be mapped to K subcarriers where each subcarrier may belong to a RB, PRB, or the like, and the RBs may be separated in frequency such that the separation, such as in terms of number of subcarriers, between consecutive RBs remains the same or constant.

Figure 14:
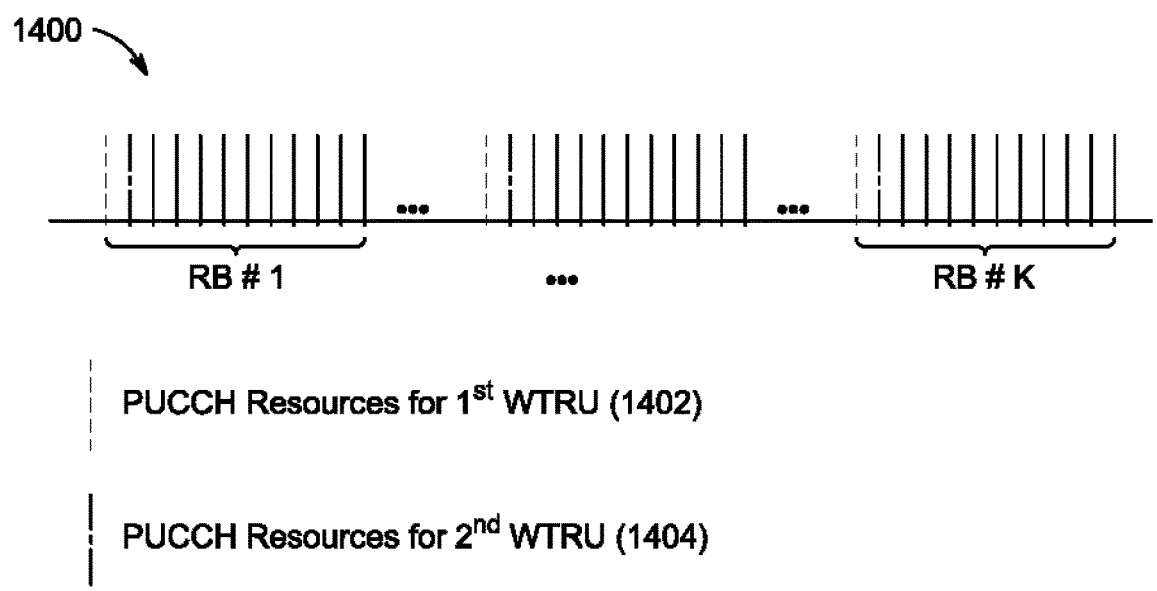
FIG. 14 is a diagram of an interleaved frequency division multiple access (IFDMA) based sPUCCH.

FIG. 14 is a diagram 1400 of an interleaved frequency division multiple access (IFDMA) based sPUCCH. A 1st subcarrier of each of the K RBs may be allocated to PUCCH resources for $1^{st}$ WTRU 1402 while the 2nd subcarrier of each of the K RBs may be allocated to PUCCH resources for $2^{nd}$ WTRU 1404. In certain configurations, K may be set to 12 and a sequence may be selected from the set of the 30 length-12 computer generated sequences.

The index of the subcarrier within the RBs may be signaled to the WTRU explicitly, may be configured, or may be signaled to the WTRU implicitly. The index of the subcarrier may be determined using an offset value. For example, offset=0 may mean the first subcarrier, offset=1 may mean the second subcarrier, etc. The offset value or subcarrier index may change in time, over a number of slots, over a number of subframes, or the like.

Referring again to Table 2, sequences may be re-used for sPUCCH transmission with a Block Interleaved Frequency Division Multiple Access (B-IFDMA) waveform. In addition to sequences in Table 2, any length-12 or other lengths may be utilized. A resulting sequence may be mapped to resource blocks on an interlace using a B-IFDMA waveform.

A WTRU may be configured to select one base sequence and one cyclic shift to apply to the base sequence. The index of the base sequence and the cyclic shift amount may be signaled to the WTRU. The same resulting sequence, the base sequence after being cyclically shifted, may be mapped to available, allocated, all, etc., RBs on an interlace using the B-IFDMA waveform for repetition.

In accordance with another configuration, the same resulting sequence, the base sequence after being cyclically shifted, may be mapped to available, allocated, all, etc., RBs on an interlace using the B-IFDMA waveform. The sequence on each RB, PRB, or the like may be multiplied with a coefficient. According to a configuration, the coefficient may be chosen from the set $\{1, -1, j, -j\}$ where $j=\sqrt{-1}$ and put in a vectors of length of $L_s$. Based on the indicated sequence index u, the WTRU may determine $r_u$ of length L. After $r_u$ is zero padded based on an indicated value C which may be a function of subcarrier spacing and the operating bandwidth, such as 20 MHz, 40 MHz, and 80 MHz, and it may be spread as $s \otimes [r_u\ 0]$. The spread vector may be multiplied with a complex coefficient $w_1$ and the resulting vector may be mapped to the subcarriers in frequency.

Figure 20A:
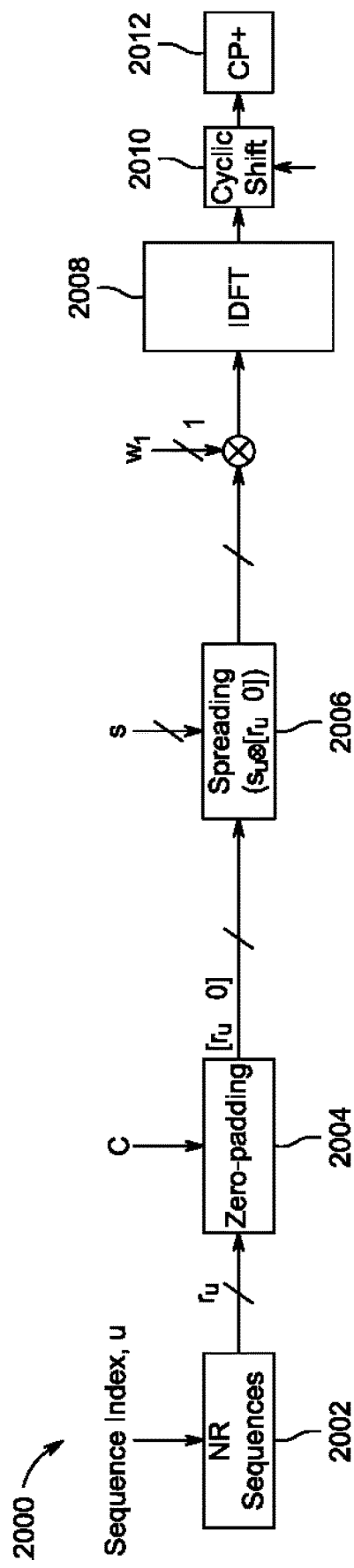
FIG. 20A is a diagram showing a vector that may be circularly shifted to indicate control information, an acknowledgement (ACK)/negative ACK (NACK), scheduling request (SR), or reference signal (RS) after an inverse discrete Fourier transform (IDFT) operation.

FIG. 20A is a diagram showing a vector that may be circularly shifted to indicate control information, an ACK, NACK, SR, RS, or the like after an IDFT operation. In 2000, NR sequences 2002 may be selected using an index, followed by a zero-padding component 2004, and spreading 2006 using s.

After weighting, an IDFT operation may be performed by IDFT component 2008 with the resulting vector circularly shifted by cyclic shift component 2010 to indicate control information, an ACK, NACK, SR, RS, or the like. A cyclic prefix may be added by CP+component 2012. The coefficients that multiply the sequence on each RB, i.e., the vector of s, may be chosen to meet a criterion or predetermined condition. For example, the criterion may be to reduce the PAPR or cubic metric (CM) of a signal or waveform.

Figure 20B:
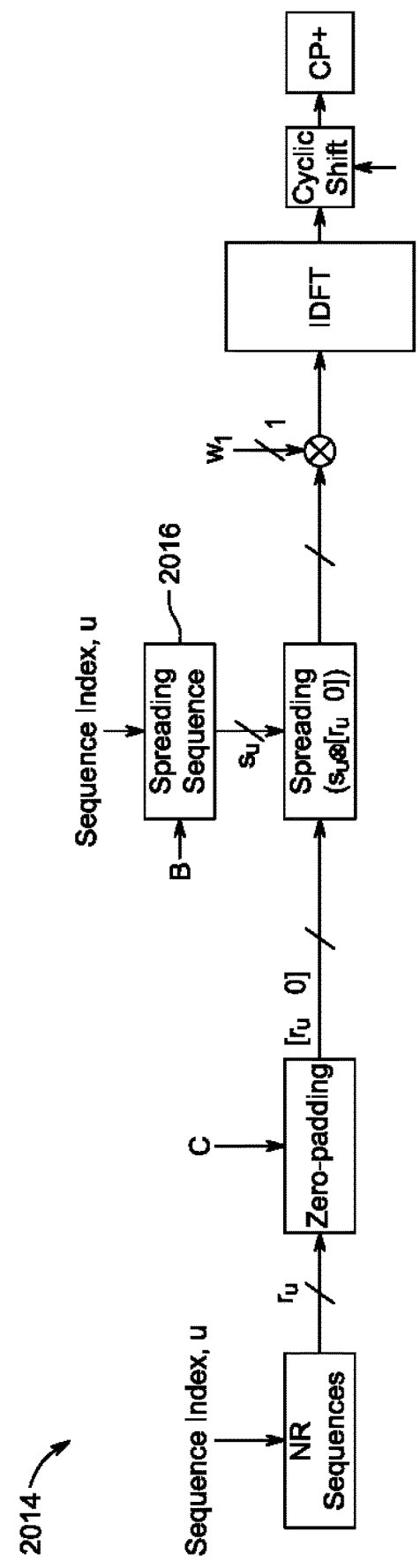
FIG. 20B is a diagram showing that a spreading sequence may be a function of the sequence index u, such as $s_u$.

FIG. 20B is a diagram 2014 showing that a spreading sequence may be a function of the sequence index u, such as $s_u$. Sequences component 2016 may utilize sequence index u and sequence B. to output $s_u$. Sequence B may be generated through an optimization process. For this configuration, $s_u$ may be based on a given $r_u$ to minimize PAPR or a CM of the produced signal or waveform. The length of spreading sequences may be a function of bandwidth parts, subcarrier spacing, operating bandwidth, or the like. Referring again to the sequences in Table 2, coefficients which minimizes PAPR and CM may be given by Table 5A and 5B. In certain configurations, a phase shift may be applied to spreading sequences without changes to the minimum PAPR value obtained in Table 5A. In addition, coefficients that multiply the sequence on each RB, PRB, or the like may be chosen such that a desired criterion or condition is met.

TABLE 1A

Minimum PAPR

| u | Cluster 1 | Cluster 2 | Cluster 3 | Cluster 4 | Cluster 5 | Cluster 6 | Cluster 7 | Cluster 8 | Cluster 9 | Cluster 10 | PAPR (dB) |
|---|---|---|---|---|---|---|---|---|---|---|---|
| 0 | '1' | '−i' | '−1' | '−1' | '1' | '−1' | '−1' | '−i' | '−1' | '−i' | 4.981434 |
| 1 | '1' | '−1' | '1' | '−i' | '−1' | '−1' | '−1' | '−1' | '−i' | '1' | 5.00048 |
| 2 | '1' | '−1' | '1' | '−i' | '−1' | 'i' | 'i' | 'i' | '−1' | '−i' | 5.126297 |
| 3 | '1' | '−i' | '−1' | '−1' | '−1' | '−i' | '1' | 'i' | '−i' | 'i' | 5.126297 |
| 4 | '1' | '−1' | '−i' | 'i' | '−1' | '−1' | '−i' | '−i' | '−i' | '−1' | 5.167649 |
| 5 | '1' | '1' | '1' | '−i' | '1' | 'i' | '1' | '−1' | '−1' | '1' | 5.115263 |
| 6 | '1' | '1' | '1' | 'i' | '1' | '−i' | '1' | '−1' | '−1' | '1' | 5.115263 |
| 7 | '1' | '−i' | '−1' | '1' | '−1' | '1' | 'i' | '−1' | '−1' | '−1' | 5.097973 |
| 8 | '1' | '1' | '1' | '−i' | '−1' | '1' | '−1' | '1' | 'i' | '−1' | 5.097973 |
| 9 | '1' | '−1' | '1' | '−i' | '−1' | '−1' | '−1' | '−1' | '−i' | '1' | 5.117264 |
| 10 | '1' | '−1' | '−i' | '1' | '1' | 'i' | 'i' | '1' | '1' | '−i' | 5.23526 |
| 11 | '1' | '−1' | 'i' | '1' | '1' | '−i' | '−i' | '1' | '1' | 'i' | 5.23526 |
| 12 | '1' | '1' | '1' | 'i' | '1' | '−i' | '1' | '−1' | '−1' | '1' | 5.159657 |
| 13 | '1' | '−1' | '1' | 'i' | '−1' | '−1' | '−1' | '−1' | 'i' | '1' | 5.210575 |
| 14 | '1' | '−1' | '−i' | 'i' | '−1' | '−1' | '−i' | '−i' | '−i' | '−1' | 5.28537 |
| 15 | '1' | '−i' | '−i' | '−i' | '1' | '1' | 'i' | '−i' | '1' | '−1' | 5.28537 |
| 16 | '1' | '−i' | '−1' | '−1' | '−1' | '−i' | '1' | 'i' | '−i' | 'i' | 5.237385 |
| 17 | '1' | '−1' | '−1' | '1' | '−i' | '1' | 'i' | '1' | '1' | '1' | 5.267747 |
| 18 | '1' | '−1' | '1' | 'i' | '−1' | '−i' | '−i' | '−i' | '−1' | 'i' | 5.20822 |
| 19 | '1' | '−1' | '1' | 'i' | '−1' | '−1' | '−1' | '−1' | 'i' | '1' | 5.202191 |
| 20 | '1' | '−i' | '−1' | '1' | '−1' | '1' | 'i' | '−1' | '−1' | '−1' | 5.097973 |
| 21 | '1' | '1' | '1' | '−i' | '−1' | '1' | '−1' | '1' | 'i' | '−1' | 5.097973 |
| 22 | '1' | 'i' | '−1' | '1' | '−1' | '1' | '−i' | '−1' | '−1' | '−1' | 5.360706 |
| 23 | '1' | '1' | '1' | 'i' | '−1' | '1' | '−1' | '1' | '−i' | '−1' | 5.360706 |
| 24 | '1' | '−i' | '−1' | '1' | '−1' | '−i' | '1' | 'i' | 'i' | 'i' | 5.33566 |
| 25 | '1' | '1' | '1' | 'i' | '−1' | '1' | '−1' | '1' | '−i' | '−1' | 5.322051 |
| 26 | '1' | '1' | '1' | '−i' | '−1' | '1' | '−1' | '1' | 'i' | '−1' | 5.322051 |
| 27 | '1' | '−1' | '1' | 'i' | '−1' | '−1' | '−1' | '−1' | 'i' | '1' | 5.363672 |
| 28 | '1' | '−1' | '1' | 'i' | '1' | '−i' | '1' | '1' | '−1' | '−1' | 5.367238 |
| 29 | '1' | '1' | '−1' | '−1' | '−i' | '−1' | 'i' | '−1' | '1' | '−1' | 5.367238 |

TABLE 5B

Minimum CM

| u | Cluster 1 | Cluster 2 | Cluster 3 | Cluster 4 | Cluster 5 | Cluster 6 | Cluster 7 | Cluster 8 | Cluster 9 | Cluster 10 | CM (dB) |
|---|---|---|---|---|---|---|---|---|---|---|---|
| 0 | '1' | '1' | '-1' | '-1' | 'i' | 'i' | '-1' | 'i' | '-i' | 'i' | 1.4219 |
| 1 | '1' | '-1' | '-1' | '1' | 'i' | '-i' | '-1' | '-i' | '-i' | '-i' | 1.6273 |
| 2 | '1' | '1' | '-1' | '-1' | 'i' | 'i' | '-1' | 'i' | '-i' | 'i' | 1.9668 |
| 3 | '1' | '1' | '-1' | '-1' | 'i' | 'i' | '-1' | 'i' | '-i' | 'i' | 1.9668 |
| 4 | '1' | '-1' | '-1' | '1' | 'i' | '-i' | '-1' | '-i' | '-i' | '-i' | 1.5205 |
| 5 | '1' | '-i' | '1' | '-i' | '-i' | '-1' | '1' | '1' | 'i' | '-1' | 1.719 |
| 6 | '1' | '1' | '-1' | '-1' | 'i' | 'i' | '-1' | 'i' | '-i' | 'i' | 1.719 |
| 7 | '1' | '-1' | '1' | 'i' | '1' | '1' | 'i' | 'i' | '-i' | '-i' | 1.5862 |
| 8 | '1' | '-i' | '-1' | '1' | '1' | 'i' | '-i' | '1' | '-i' | '1' | 1.5862 |
| 9 | '1' | '-1' | '-1' | '1' | '-i' | 'i' | '-1' | 'i' | 'i' | 'i' | 1.7077 |
| 10 | '1' | '1' | '-1' | '-1' | 'i' | 'i' | '-1' | 'i' | '-i' | 'i' | 1.8671 |
| 11 | '1' | '-1' | '1' | 'i' | '1' | '1' | 'i' | 'i' | '-i' | '-i' | 1.8671 |
| 12 | '1' | '-i' | '-1' | '1' | '1' | 'i' | '-i' | '1' | '-i' | '1' | 1.7414 |
| 13 | '1' | '1' | '-1' | '-1' | '-i' | '-i' | '-1' | '-i' | 'i' | '-i' | 1.8349 |
| 14 | '1' | '-1' | '-1' | '1' | 'i' | '-i' | '-1' | '-i' | '-i' | '-i' | 1.824 |
| 15 | '1' | '-1' | '-1' | '1' | 'i' | '-i' | '-1' | '-i' | '-i' | '-i' | 1.824 |
| 16 | '1' | 'i' | '-1' | '1' | '1' | '-i' | 'i' | '1' | 'i' | '1' | 1.7637 |
| 17 | '1' | '-i' | '1' | '-i' | '-i' | '-1' | '1' | '1' | 'i' | '-1' | 1.598 |
| 18 | '1' | '-1' | '-1' | '1' | '-i' | 'i' | '-1' | 'i' | 'i' | 'i' | 1.4716 |
| 19 | '1' | '-i' | '-1' | '1' | '1' | 'i' | '-i' | '1' | '-i' | '1' | 1.7077 |
| 20 | '1' | '1' | '-1' | '-1' | '-i' | '-i' | '-1' | '-i' | 'i' | '-i' | 1.5862 |
| 21 | '1' | '-i' | '-1' | '1' | '1' | 'i' | '-i' | '1' | '-i' | '1' | 1.5862 |
| 22 | '1' | 'i' | '-1' | '1' | '1' | '-i' | 'i' | '1' | 'i' | '1' | 1.7748 |
| 23 | '1' | '-i' | '-1' | '1' | '1' | 'i' | '-i' | '1' | '-i' | '1' | 1.7748 |
| 24 | '1' | '-i' | '-1' | '1' | '1' | 'i' | '-i' | '1' | '-i' | '1' | 1.7748 |
| 25 | '1' | '1' | '-1' | '-1' | 'i' | 'i' | '-1' | 'i' | '-i' | 'i' | 1.7637 |
| 26 | '1' | '-i' | '1' | '-i' | '-i' | '-1' | '1' | '1' | 'i' | '-1' | 1.7637 |
| 27 | '1' | 'i' | '-1' | '1' | '1' | '-i' | 'i' | '1' | 'i' | '1' | 1.6215 |
| 28 | '1' | 'i' | '-1' | '-1' | '1' | '-i' | '-i' | '-1' | '-i' | '-1' | 1.7526 |
| 29 | '1' | 'i' | '-1' | '-1' | '1' | '-i' | '-i' | '-1' | '-i' | '-1' | 1.7526 |

In another configuration, the same base sequence may be mapped to available, allocated, all, etc. RBs on an interlace using the B-IFDMA waveform. However, the cyclic shift applied to the sequences on different RBs may be different. In the examples given herein, the cyclic shift applied may be a function of a parameter signaled to the WTRU, one or more parameters already known to the WTRU, a RB index, a PRB index, the base sequence index, a symbol number, a slot number, a subframe number, a frame number, or the like. The sequence on each RB may be multiplied with a coefficient. As an example, the coefficient may be chosen from the set $\{1, -1, j, -j\}$ where $j=\sqrt{-1}$. In addition, coefficients that multiply the sequence on each RB may be chosen such that a desired criterion or condition is met.

In accordance with another configuration, one of the 30 base sequences may be mapped to one RB, PRB, or the like of an interlace after a cyclic shift. The base sequences mapped to the RBs of an interlace may be the same or different. An example is given in Table 6 where an interlace in B-IFDMA includes 10 RBs.

TABLE 6

| RB index | 1 | 2 | 3 | 4 | 5 | 6 | 7 | 8 | 9 | 10 |
|---|---|---|---|---|---|---|---|---|---|---|
| Sequence Index (u) | 0 | 2 | 6 | 0 | 9 | 16 | 22 | 29 | 2 | 15 |

The base sequences mapped to the RBs of an interlace may be subject to the same cyclic shift. The sequence on each RB may be multiplied with a coefficient. For example, the coefficients may be chosen from the set $\{1, -1, j, -j\}$ where $j=\sqrt{-1}$.

A sequence and RB/PRB combination, or which sequence is mapped to which RB, and the coefficient that multiplies each sequence may be searched with an algorithm so that a specific criterion may be met. For example, the search may find the sequence or RB combination and set of multipliers so that the resulting signal or waveform has low PAPR. The cyclic shift applied to the sequences on different RBs may be the same or different. The cyclic shift applied to a sequence may be a function of at least one of a parameter signaled to the WTRU, one or more parameters already known to the WTRU, a RB index, a base sequence index, a symbol number, a slot number, a subframe number, a frame number, or the like.

The sequence and RB/PRB combinations may be specified in a table with a variable number of rows, such as rows. In certain configurations, a combination may be used in one cell. To minimize inter-cell interference, it is desirable to prevent the same sequence being used on the same RB in different cells. For this configuration, the columns of a table may have distinct sequence indices. For example, the sample 2-row Table 7 may not meet this criterion because the same base sequences are mapped to RBs 2 and 5. The sample 2-row Table 8, however, may meet this criterion. In a directional transmission with beamforming, the index of the sequence or the index of the set of coefficients applied for to a given sequence may be used to transmit the beam index.

TABLE 7

| RB index | 1 | 2 | 3 | 4 | 5 | 6 | 7 | 8 | 9 | 10 |
|---|---|---|---|---|---|---|---|---|---|---|
| Sequence Index (u) | 0 | 2 | 6 | 0 | 9 | 16 | 22 | 27 | 2 | 15 |
| Sequence Index (u) | 3 | 2 | 7 | 19 | 9 | 22 | 11 | 29 | 4 | 16 |

TABLE 8

| RB index | 1 | 2 | 3 | 4 | 5 | 6 | 7 | 8 | 9 | 10 |
|---|---|---|---|---|---|---|---|---|---|---|
| Sequence Index (u) | 0 | 2 | 6 | 0 | 9 | 16 | 22 | 27 | 2 | 15 |
| Sequence Index (u) | 3 | 4 | 7 | 19 | 13 | 22 | 11 | 29 | 4 | 16 |

A sPUCCH format with more than 2 bits using an OFDM waveform may be configured in NR. In this format, coded and QPSK modulated symbols may be mapped to a set of subcarriers over a group of consecutive RBs. One or more subcarriers in each RB may be allocated for reference symbols. This configuration may be extended to support user multiplexing when B-IFDMA resource allocation is used or where one interlace is composed of K RBs, such as K=10, distributed evenly over a channel bandwidth.

Figure 15:
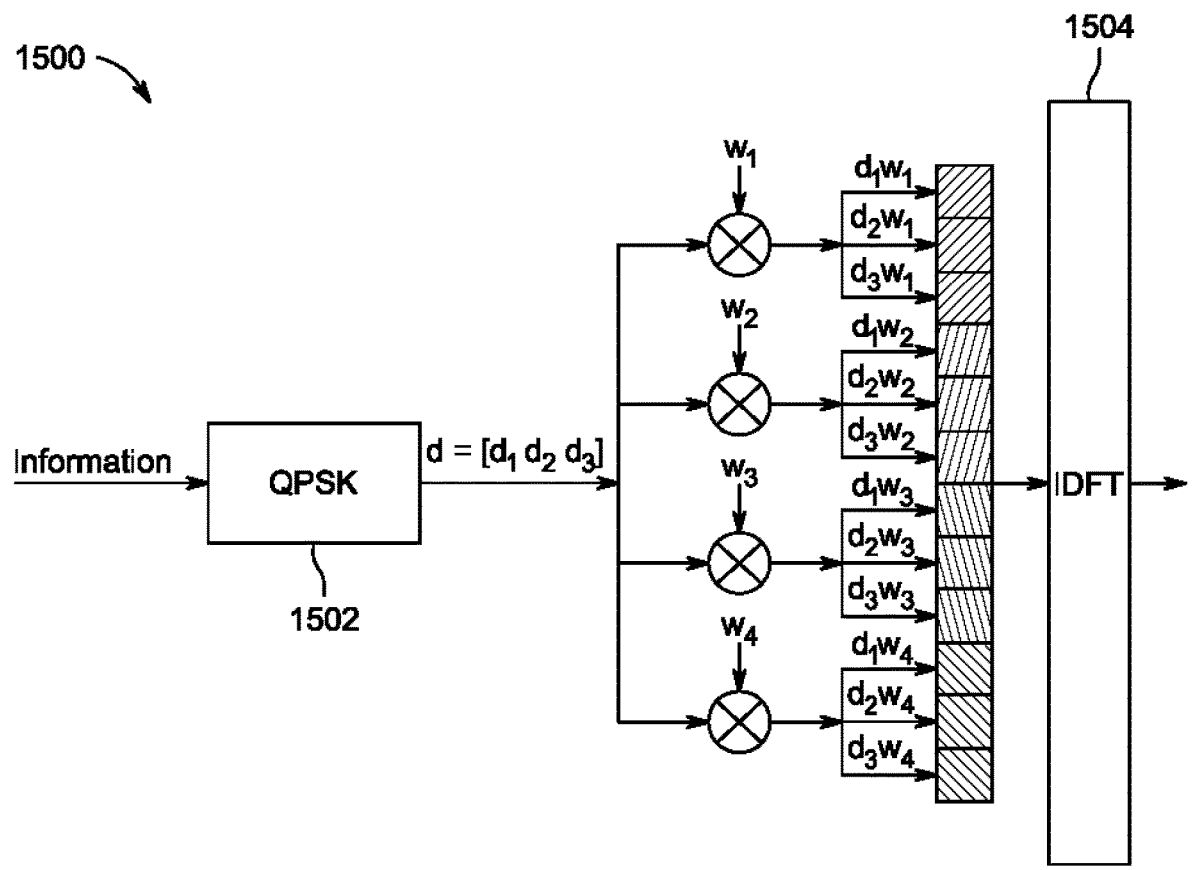
FIG. 15 is a diagram showing user multiplexing within an interlace using spreading in a transmitter or transceiver.
Figure 16:
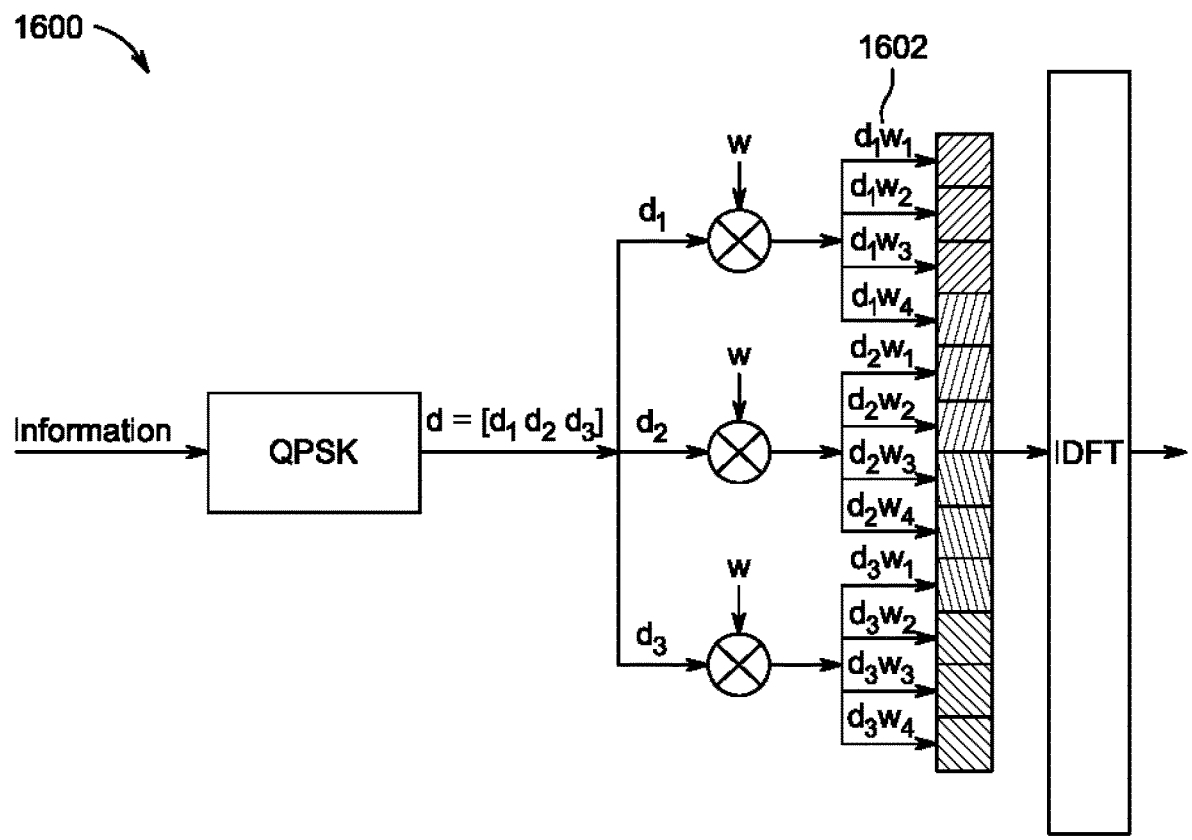
FIG. 16 is another diagram showing user multiplexing within an interlace using spreading.

FIG. 15 is a diagram 1500 showing user multiplexing within an interlace using spreading in a transmitter or transceiver. FIG. 16 is another diagram 1600 showing user multiplexing within an interlace using spreading. In 1500 or 1600, user multiplexing may utilize orthogonal spreading sequences and the spreading operation is illustrated for one or more RB(s) of an interlace. However, the spreading operation may also be applied on available, allocated, all, etc. RBs of an interlace similarly before mapping the subcarriers to the IDFT. When the same sequence is used for one or more RBs different orthogonal codes may be utilized.

In 1500, information may be modulated by QPSK modulator 1502 and vector of information symbols [d1 d2 d3] may be mapped to consecutive inputs of IDFT component 1504 after being scaled with a respective coefficient of spreading sequences $w_1 \ldots w_4$. As opposed to 1500, in 1600 a spreading sequence may be mapped 1602 to consecutive IDFT inputs after being scaled with a coefficient of the data vector. In addition, 1500 and 1600 may be configured to allocate certain subcarriers to reference symbols while keeping the same spreading operation.

In 1500 or 1600, user multiplexing may be configured by assigning partial interlace to a WTRU. As an example, the first 6 subcarriers of each RB, PRB, or the like in an interlace may be allocated to one WTRU while the last 6 subcarriers of each RB, PRB, or the like in an interlace may be allocated to another WTRU. A partial interlace may be configured to increase the number of orthogonal interlaces without overlapping resources or signals in the frequency domain.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method performed by a wireless transmit/receive unit (WTRU), the method comprising:
   receiving a downlink transmission; and
   sending 1 bit or 2 bits of uplink control information (UCI) in each resource block (RB) of a physical uplink control channel (PUCCH) transmission comprising an interlace of a plurality of RBs in an active bandwidth part (BWP) of an unlicensed carrier,
   wherein a respective low peak-to-average power (PAPR) sequence is used to map the PUCCH transmission repetitively, once to each RB of the plurality of RBs of the interlace,
   wherein each respective low PAPR sequence includes a different cyclic shift of a same base sequence in each RB,
   wherein each different cyclic shift of the respective low PAPR sequence used in mapping the PUCCH transmission to each RB of the interlace, is a function of a RB index of the respective RB, and
   wherein the UCI indicates either an acknowledgement (ACK) or a negative ACK (NACK) of the downlink transmission.

2. The method of claim 1, wherein the interlace comprises a number of RBs distributed evenly over a channel bandwidth.

3. The method of claim 2, wherein the distribution is achieved using orthogonal spreading sequences.

4. A method performed by a wireless transmit receive unit (WTRU), the method comprising:
   sending 1 bit or 2 bits of uplink control information (UCI) in a physical uplink control channel (PUCCH) transmission using an interlace of a plurality of resource blocks (RBs) in an active bandwidth part (BWP) of an unlicensed carrier, wherein a respective low peak-to-average power (PAPR) sequence is mapped to each RB of the plurality of RBs of the interlace, wherein the respective low PAPR sequence mapped to each RB is derived from a different cyclic shift of a same base sequence used to represent the UCI, wherein the different cyclic shift used for each RB is a function of the RB index of the respective RB.

5. The method of claim 4, wherein each mapped sequence is multiplied by a scaling coefficient.

6. The method of claim 4, wherein the PUCCH transmission comprises a PUCCH format 0 transmission or a PUCCH format 1 transmission.

7. The method of claim 4, wherein the PUCCH transmission conveys one of an acknowledgement (ACK) or a negative ACK (NACK) for a downlink data transmission or a scheduling request (SR) for an uplink data transmission.

8. A wireless transmit receive unit (WTRU) comprising:
   a transmitter and a processor communicatively coupled to the transmitter, the transmitter and processor configured to:
      send 1 bit or 2 bits of uplink control information (UCI) in a physical uplink control channel (PUCCH) transmission using an interlace of a plurality of resource blocks (RBs) in an active bandwidth part (BWP) of an unlicensed carrier, wherein a respective low peak-to-average power (PAPR) sequence is mapped to each RB of the plurality of RBs of the interlace, wherein the respective low PAPR sequence mapped to in each RB is derived from a different cyclic shift of a same base sequence, wherein the different cyclic shift used for each RB of the interlace is a function of an RB index of the respective RB.

9. The WTRU of claim 8, wherein each mapped sequence is multiplied by a scaling coefficient.

10. The WTRU of claim 8, wherein the PUCCH transmission comprises a PUCCH format 0 or a PUCCH format 1 transmission.

11. The WTRU of claim 8, wherein the PUCCH transmission conveys one of an acknowledgement (ACK) or a negative ACK (NACK) for a downlink data transmission or a scheduling request (SR) for an uplink data transmission.

12. The WTRU of claim 8, wherein each RB of the interlace includes a same base sequence cyclically shifted as a function of an index of the respective RB of the interlace of the plurality of RBs.

13. The WTRU of claim 8, wherein the plurality of RBs of the interlace are distributed evenly over a channel bandwidth.

14. The WTRU of claim 13, wherein the distribution is achieved using orthogonal spreading sequences.

\* \* \* \* \*